(12) United States Patent
Schamin et al.

(10) Patent No.: US 12,241,507 B2
(45) Date of Patent: Mar. 4, 2025

(54) DISCHARGE DEVICE FOR DISCHARGING AN ELECTRICAL CHARGE FROM A ROTOR OF AN ELECTRIC MOTOR

(71) Applicant: Schaeffler Technologies AG & Co. KG, Herzogenaurach (DE)

(72) Inventors: Alexander Schamin, Oberasbach (DE); Sebastian Giehl, Burgebrach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 327 days.

(21) Appl. No.: 17/783,361

(22) PCT Filed: Aug. 19, 2020

(86) PCT No.: PCT/DE2020/100721
§ 371 (c)(1),
(2) Date: Jun. 8, 2022

(87) PCT Pub. No.: WO2021/115517
PCT Pub. Date: Jun. 17, 2021

(65) Prior Publication Data
US 2023/0013562 A1   Jan. 19, 2023

(30) Foreign Application Priority Data
Dec. 11, 2019   (DE) .......................... 102019133888.3

(51) Int. Cl.
*H01R 41/00*   (2006.01)
*F16C 19/06*   (2006.01)
(Continued)

(52) U.S. Cl.
CPC ............ *F16C 41/002* (2013.01); *F16C 19/06* (2013.01); *F16C 33/586* (2013.01);
(Continued)

(58) Field of Classification Search
CPC ...... F16C 41/002; F16C 19/06; F16C 33/586; F16C 33/7846; F16C 33/7886;
(Continued)

(56) References Cited

U.S. PATENT DOCUMENTS 8,183,727 B2 * 5/2012 Fee ........................ H02K 11/40
310/90
8,970,075 B2 * 3/2015 Rippel ..................... H02K 1/32
310/60 A
(Continued)

FOREIGN PATENT DOCUMENTS

| | | |
|---|---|---|
| CN | 107690746 | 2/2018 |
| CN | 109155573 | 1/2019 |

(Continued)

*Primary Examiner* — Alexander Gilman
(74) *Attorney, Agent, or Firm* — Volpe Koenig

(57) ABSTRACT

A discharge device for discharging an electrical charge and/or voltage from a rotor of an electric motor via a shaft from a first discharge partner to a second discharge partner, the discharge device including a support body device, wherein the support body device includes a connecting portion for electrical and mechanical connection to one of the discharge partners and expanding portions for expanding the connection of the support body device to the one of the discharge partners, wherein the expanding portions include the connecting portion.

17 Claims, 10 Drawing Sheets

(51) Int. Cl.
  *F16C 33/58* (2006.01)
  *F16C 33/78* (2006.01)
  *F16C 41/00* (2006.01)
  *H02K 11/40* (2016.01)

(52) U.S. Cl.
  CPC ...... *F16C 33/7846* (2013.01); *F16C 33/7886* (2013.01); *H02K 11/40* (2016.01); *F16C 2202/32* (2013.01); *F16C 2226/74* (2013.01); *F16C 2380/26* (2013.01)

(58) Field of Classification Search
  CPC .............. F16C 2202/32; F16C 2226/74; F16C 2380/26; F16C 19/52; H02K 11/40; H02K 5/15; H02K 5/124; H02K 7/006; H02K 5/1732; H02K 7/116
  USPC .......................................................... 439/17
  See application file for complete search history.

(56) References Cited

U.S. PATENT DOCUMENTS

| | | | | |
|---|---|---|---|---|
| 9,581,203 | B2* | 2/2017 | White | F16C 33/7823 |
| 9,790,995 | B2* | 10/2017 | White | F16C 41/002 |
| 10,190,640 | B2* | 1/2019 | Hutchison | F16C 41/002 |
| 10,253,815 | B2* | 4/2019 | Hart | F16C 33/7856 |
| 10,612,599 | B2* | 4/2020 | White | F16C 33/7856 |
| 10,816,038 | B1* | 10/2020 | Shanbhag | F16C 35/077 |
| 10,927,897 | B2* | 2/2021 | Roman | F16C 19/06 |
| 11,028,882 | B2* | 6/2021 | Roman | F16C 41/002 |
| 11,384,793 | B2* | 7/2022 | Schamin | F16C 33/784 |
| 11,549,556 | B2* | 1/2023 | Berruet | F16C 19/52 |
| 11,757,320 | B2* | 9/2023 | Graves | H02K 7/003 310/90 |
| 11,942,836 | B2* | 3/2024 | Griesbach | H02K 11/40 |
| 2004/0081380 | A1* | 4/2004 | Katagiri | F16C 13/02 384/462 |
| 2008/0223966 | A1* | 9/2008 | Lipowski | B02C 18/24 241/101.2 |
| 2010/0127585 | A1* | 5/2010 | Fee | H02K 11/40 310/71 |
| 2011/0317953 | A1* | 12/2011 | Moratz | F16C 33/7843 384/572 |
| 2013/0300187 | A1* | 11/2013 | Konrad | B60B 27/0047 301/105.1 |
| 2014/0203514 | A1* | 7/2014 | Colineau | F16J 15/3232 277/549 |
| 2014/0334758 | A1* | 11/2014 | White | F16C 33/78 384/477 |
| 2016/0003298 | A1* | 1/2016 | Masuch | F16C 33/50 83/13 |
| 2016/0032981 | A1* | 2/2016 | White | F16C 41/002 384/448 |
| 2017/0108047 | A1* | 4/2017 | White | F16C 33/82 |
| 2018/0241287 | A1* | 8/2018 | Na | H02K 5/1675 |
| 2018/0320696 | A1* | 11/2018 | Han | H02K 49/108 |
| 2019/0199180 | A1* | 6/2019 | Huber | H02K 5/225 |
| 2019/0234406 | A1* | 8/2019 | Homma | H02K 1/2791 |
| 2019/0296612 | A1* | 9/2019 | Okuhata | H02K 11/33 |
| 2020/0292079 | A1* | 9/2020 | Ito | F16J 15/162 |
| 2023/0015934 | A1* | 1/2023 | Schamin | F16C 41/002 |

FOREIGN PATENT DOCUMENTS

| | | |
|---|---|---|
| DE | 102013000982 | 7/2014 |
| JP | 2014240676 | 12/2014 |
| JP | 2015207533 | 11/2015 |
| WO | 2010145890 | 12/2010 |
| WO | 2019131899 | 7/2019 |

* cited by examiner

DISCHARGE DEVICE FOR DISCHARGING AN ELECTRICAL CHARGE FROM A ROTOR OF AN ELECTRIC MOTOR

CROSS-REFERENCE TO RELATED APPLICATIONS

This application is the U.S. National Phase of PCT Appln. No. PCT/DE2020/100721, filed Aug. 19, 2020, which claims priority from German Patent Application No. DE 10 2019 133 888.3, filed Dec. 11, 2019, the entire disclosures of which are incorporated by reference herein.

TECHNICAL FIELD

The disclosure relates to a discharge device for discharging an electrical charge and/or voltage from a rotor of an electric motor from a first discharge partner to a second discharge partner. The disclosure also relates to an electric drive assembly having the discharge device.

BACKGROUND

In electric vehicles or hybrid vehicles, an electric machine is used as a traction motor. While the electric machine seems to work with little or no wear and, in particular, very few problems when viewed superficially, problems arise on closer inspection which can be attributed to the functioning of the electric machines. It is known that voltages and/or charges are induced in the rotor of the electric machine, so that potential differences of several hundred volts can build up between the rotor and a housing.

The rotor is usually designed to be integral with a rotor shaft or is mechanically connected to it, and there is also electrical contact between the rotor and the rotor shaft, so that the potential difference is present between the rotor shaft and the housing at the same time. The rotor shaft is usually mounted in relation to the housing by means of rolling bearings. In the rolling bearings, the potential difference leads to discharges between the rolling elements and the rolling element raceways, as a result of which the rolling element raceways are damaged.

DE 10 2013 000 982 A1 shows a sealing arrangement having at least one dynamically stressed sealing lip and a buffer seal which is arranged at an axial distance adjacent to the sealing lip. The buffer seal consists of an electrically conductive material.

SUMMARY

The disclosure is based on the object of creating a discharge device for a drive assembly which is characterized by simple and cost-effective production. This object is achieved by a discharge device having one or more of the features described herein and by a drive assembly having one or more of the features described herein.

The disclosure relates to a discharge device which is provided in particular for electric drive systems in electric vehicles or hybrid vehicles.

The electric drive assembly includes an electric motor section. An electric motor, also referred to as an electric machine, is arranged in the electric motor section. The electric motor is preferably designed as an asynchronous electric motor.

The electric drive assembly has a transmission section, wherein a transmission device is arranged in the transmission section. The transmission device can have a clutch device and/or a shifting device and a transmission device. The shaft is connected to the transmission device in terms of transmission technology, and in particular the shaft forms an input shaft into the transmission device.

The discharge device has the function of discharging an electrical charge and/or electrical voltage from the rotor, preferably via the shaft, wherein a shaft forms a first discharge partner, for example. The discharge takes place to a second discharge partner. The second discharge partner is designed in particular as a stationary discharge partner. The second discharge partner is preferably designed as a housing section or as a surrounding structure or component which is electrically conductively connected to the housing section. All conceivable machine elements and components can be considered as second discharge partners. According to one embodiment, it is provided that the second discharge partner is a rolling bearing ring of a rolling bearing. In particular, the second discharge partner is connected to ground and/or is grounded. In particular, the discharge device forms an electrical connection between the first discharge partner and the second discharge partner. In particular, there is a permanent electrical connection between the discharge partners, which is present both in both a stationary and dynamic manner, i.e., during operation of the electric drive assembly. Alternatively, rolling bearing rings as well as shafts or other components or machine elements or machine parts can be considered as second discharge partners.

The discharge device is formed at least from a support body device, a contact device with at least one discharge component and at least one clamping region and/or at least one retaining support part.

The discharge device has a support body device which in particular forms a support for one or more discharge components of the discharge device. An example of a support body device is a serrated ring.

The support body device has at least one connecting portion. The connecting portion is used for a direct or indirect mechanical connection to one of the discharge partners, i.e., essentially as an alternative to a movable connection to the discharge partner or preferably to a fixed fit in, to or on the discharge partner. The connecting portion is used for the direct or indirect electrical connection to the discharge partner. The mechanical and electrical connection can coincide, but these can also be implemented side by side or in parallel with one another. The electrical connection is optionally a permanent fixed electrical connection or alternatively also temporary, for example switchable. An example of a connecting portion is the surface of an expanding portion, for example a retaining claw of the support body device such as that of the serrated ring.

The support body device has a support section. The support section provides a connection interface for the mechanical and electrical connection of the at least one discharge component. The support section is essentially used for an electrically conductive connection between the support body device and the discharge component.

Furthermore, the discharge device has a contact device which, in particular as an electrically conductive discharge component, implements a discharge function. The contact device has a contacting portion, wherein the contacting portion is used for direct or indirect electrical connection to the other of the discharge partners. For this purpose, the contacting portion can, for example, be electrically connected directly to the other discharge partner or be in sliding contact against this. Alternatively, however, the contacting portion can also be indirectly electrically connected to the other discharge partner, for example via an electrically conductive intermediate component arranged on the shaft. Furthermore, the contact device has an attachment portion, via which the contact device is connected to the support section of the support body device. For example, the attachment portion is axially an annular zone of a conductive perforated disc, wherein the contact device is attached to the support body device via the attachment portion. The contact device with the attachment portion is preferably connected indirectly via the support body device, in particular the support section, to the first discharge partner. An example of a contact device is a perforated disc made of a conductive fabric.

According to the disclosure, the support body device has one or more than one expanding portion, preferably a plurality of expanding portions. The expanding portions are preferably designed in their basic form as elongated wings or as resilient tabs or as claws or as prongs. The expanding portions are designed relative to the support body device in such a way that the expanding portions extend at an angle from the support body device. The expanding portions form an expanding connection, optionally radially inwards or radially outwards, between the support body device and one of the discharge partners. Furthermore, the expanding regions form the connecting portion, wherein the expanding regions serve for the mechanical and electrical connection, in particular for the direct or indirect mechanical and electrical connection, with one of the discharge partners. The support body device is preferably a stamped sheet metal part made from sheet steel and can additionally be provided with an electrically conductive coating.

The expanding connection can be implemented in two ways. On the one hand, an expanding connection can be provided by bracing and on the other hand by expanding. In the case of bracing, the expanding regions of the discharge device are expanded radially outwards before they are installed in an internally hollow recess in such a way that they initially do not fit into the recess. A representative example of such a recess is a housing bore or the inner contour in an outer ring of a rolling bearing. In this context, bracing is to be understood as meaning a radial elastic deflection of the expanding regions when they are inserted into a bore. When the discharge device is in its intended position in the recess, the expanding portions expand radially outwards due to their radial elastic pre-loading and wedging firmly into the recess or claws therein, or clamp therein or snap into the recess of a machine element or housing due to the effect of radial elastic pre-loading towards the outside.

In the case of expanding, the expanding regions of the discharge device are expanded radially inwards on the outside of an outer contour before they are installed in such a way that they initially do not fit on the outer contour. Representative examples of such outer contours are the outer contours of shafts or of outer rings or inner rings of rolling bearings. Expanding is to be understood as meaning a radial, elastic widening of the expanding portions during assembly onto the outer contour. When the discharge device is in its intended position on the outer contour of the machine element, the expanding portions expand radially inwards against the machine element due to their radial elastic pre-loading and lock there, snapping into the machine element.

The discharge device can be designed to be supported and/or is supported on one of the discharge partners by the support body device with expanding portions, preferably in the radial direction. The discharge device is preferably clamped resiliently and/or flexibly on one of the discharge partners, or placed thereon, wherein the expanding portions preferably exert a radial spring and/or expanding force for radially supporting the discharge device against one of the discharge partners. Radial is directed transversely to the axis of rotation of the rotor shaft or transmission shaft or any other conceivable shaft. Accordingly, axial is in the same direction as the axis of rotation.

The discharge device can advantageously be arranged at various different positions in the drive assembly. With it, small or large radial distances can be bridged, so that a high degree of design freedom is created. The discharge device can be connected in particular to the housing section via the expanding portions, wherein the expanding portions for example claw into a surface of the housing section or alternatively are coupled to the shaft and/or rotor shaft in a rotationally fixed manner. This also means that the discharge device can be installed easily. It is also advantageous that the resilient and/or flexible radial support of the expanding portions can bridge large tolerances between the two discharge partners, for example due to an imbalance in the shaft or the bore tolerances of roughly machined housing bores, and the fine machining of such locations is no longer necessary. It is also advantageous that no surface treatment and/or preparation of a seat on one of the discharge partners is necessary for the installation of the discharge device, wherein the discharge device is easily retrofittable for the drive assembly due to the expanding connection, so that a cost-effective drive assembly is created.

In a preferred embodiment, it is proposed that the support body device has a base body region and at least one clamping region.

The base body region is designed, for example, in the shape of an annular disc. The base body region can preferably be seen as a supporting base body of the discharge device, wherein the clamping region is preferably designed for a clamped connection to the attachment portion.

The clamping region generates a clamping force to establish the clamping connection, wherein the clamping force is transmitted and/or is transmittable to the attachment portion and the attachment portion is thus clamped and held, for example, axially. Furthermore, the clamping region can be connected in one piece to the base body region. The base body region and the expanding portions are preferably designed to be integral. The base body region, the expanding regions and the clamping region are particularly preferably designed to be integral, wherein these are preferably made of a resilient and electrically conductive material, for example an electrically conductive metal. The attachment portion of the contact device is clamped between the base body region and the at least one clamping region.

Preferably, the attachment portion is directly or indirectly mechanically connected to the base body region and the clamping region, for example clamped.

The support body device preferably has one or more connecting parts, wherein the connecting parts are arranged between the attachment portion and the base body region and/or the clamping region. The connecting parts are preferably designed to enlarge a connecting surface between the base body region or the clamping region and the attachment portion, so that the retaining force can be transmitted to the attachment portion over the entire connection region. In addition, as elastic intermediate layers, the connecting parts can increase conductivity and/or improve the clamping effect of clamps or brackets. In addition, particularly delicate material of the contact device can be protected from sharp edges of the sheet metal elements by the intermediate layer in the clamping region.

The base body region and the clamping region are particularly preferably designed for the electrical connection of the contact device to the support body device. In particular, the base body region and the clamping region are designed as an electrical connection for the attachment portion of the contact device. The connecting part is particularly preferably also inserted and clamped between the attachment portion and the clamping region. The connecting part is preferably formed from an electrically conductive material, for example an electrically conductive metal. Alternatively or optionally in addition, the connecting part is made of a soft material, for example a plastic or aluminum material, so that the clamping regions claw onto and/or into the connecting part or at least deform in a retaining manner. In the case of a non-electrically conductive connecting part, at least the base body region or the clamping region must be connected directly to the attachment portion in order to ensure electrical conductivity of the discharge device.

Elements of the support body device are preferably reshaped around the attachment section by 180° on the edge side, so that the clamping regions support the clamping of the attachment section. The expanding portions are in turn preferably bent by about 90° in such a way that the expanding portions are resiliently and/or flexibly supported on one of the discharge partners and the attachment portion is clamped resiliently by the clamping regions.

The support body device is particularly preferably designed as a serrated ring and/or as a clamping ring. Serrated rings are usually securing elements in bores. Starting from a base body region designed in the shape of an annular disc, elastic prongs extend radially outwards or radially inwards. The prongs can also be angled from the base body and thus run at an angle to the radial direction. At their ends, the prongs usually have sharp edges with which they can get stuck in the wall of the bore. The serrated ring is inherently elastic and is preferably made of thin sheet metal, for example spring steel. The serrated ring is preferably designed so that it can be arranged concentrically around the shaft and/or rotor shaft, wherein the serrated ring comprises the base body region, the clamping regions and the plurality of expanding portions. The expanding portions are preferably arranged in the circumferential direction around the serrated ring and are designed to be uniformly spaced apart from one another. The serrated ring can be designed for bores with external expanding portions or for shafts with internal expanding portions. Depending on the design and use, the expanding portions are arranged on an outer diameter or on an inner diameter of the serrated ring. The contact device is preferably designed as a ring and/or as a curved annular disc or as a cup spring, wherein the expanding regions of the serrated ring preferably encompass the contact device and the clamping regions securing the contact device.

In an alternative embodiment, it is proposed that the support body device has an expanding support part with the expanding portions and a base body region and a retaining support part with at least one coupling region and one clamping region. In particular, the expanding support part and the retaining support part are designed in two parts and/or as separate components. In other words, the support body device preferably has a two-part design. The retaining support part can be connected to the expanding support part, wherein the coupling region connects the retaining support part to the expanding support part. The coupling region is preferably designed to engage behind the expanding support part, wherein the coupling region connects the retaining support part to the expanding support part in a friction-fitting and/or form-fitting manner. The retaining support part preferably has a plurality of coupling regions, in particular at least or exactly two coupling regions. The retaining support part particularly preferably has the same number of coupling regions as the expanding support part has of expanding portions. The coupling regions on the retaining support part are preferably designed to be spaced apart from one another, as are preferably the expanding portions on the expanding support part, wherein one coupling region engages between two expanding portions. The coupling regions are preferably designed as wings or flaps or prongs or tabs, wherein the coupling regions are preferably made of a flexible material, for example sheet metal. Examples of retaining supports are brackets or clamps or retaining rings, on which retaining lugs, retaining clamps or retaining brackets are integrally designed for attachment to the base body region or the support body device.

Furthermore, the attachment portion is clamped between the base body region and the clamping region. The clamping region clamps the attachment portion of the contact device between itself and the base body region, wherein the coupling regions secure the retaining support part on the expanding support part, in particular in the radial and axial direction in relation to the shaft. The clamping region preferably transmits the retaining force to the attachment portion, wherein the attachment portion is secured in a clamping manner by frictional locking. The attachment portion is preferably clamped directly or indirectly between the base body region and the clamping region. The connecting portion for mechanically and electrically connecting the contact device to the support body device is particularly preferably clamped in by the base body region and the clamping region. The retaining support part and the expanding support part are preferably made of an electrically conductive material, for example an electrically conductive metal.

The connecting portion for the electrical connection to one of the discharge partners is formed by the expanding portions of the expanding support part, wherein the support section for attaching the attachment portion of the contact device with the contacting portion for electrically connecting to the other discharge partner is formed preferably by the base body region and the clamping region, so that the electrical charge and/or voltage of the shaft is and/or can be discharged via the discharge device from the first discharge partner to the second discharge partner.

In an advantageous development, it is provided that the expanding support part and the retaining support part are designed as two separate components, which are connected to one another in at least or exactly one coupling region via a reshaping process. The expanding support part and the retaining support part together hold the attachment portion and/or form the support section. In particular, the attachment portion is arranged in the axial direction between the support part and the retaining part. The expanding support part and/or the retaining support part is/are particularly preferably designed as metallic parts, in particular as reshaped sheet metal parts. It is advantageous that the discharge device can be manufactured in a simple manner by using sheet metal reshaping technology. Furthermore, it is advantageous that the use of reshaped sheet metal parts provides electrical conductivity through the components of the discharge device itself, so that no other electrically conductive materials have to be used.

For example, clinching or toxing can be used as reshaping processes. These reshaping methods can be mastered reliably and implemented cost-effectively.

According to the configuration, the expanding support part or the retaining support part can therefore preferably have a connection opening and the other part, i.e., the retaining support part or the expanding support part, can have a reshaped region which at least engages in the connection opening or even penetrates through it in order to form the reshaped region. For example, the reshaped region can be designed as an open hollow rivet region, wherein the hollow rivet region has a hollow-cylindrical shaped neck which is adjoined by a collar which forms a closing head. The collar lies circumferentially, preferably closed circumferentially, against an edge of the connection opening and in this way secures the connection. This manufacturing process can also be referred to as riveting.

In a further specification, it is provided that the support body device has a support region which is designed and/or suitable for supporting the contact device. The support region adjoins the base body region at an angle, wherein a support angle is formed between the base body region and the support region. The base body section preferably extends in a radial plane with respect to the main axis, wherein the support region adjoins the carrying section at a support angle of more than 10 degrees, preferably more than 30, preferably more than 50 degrees, with respect to the radial plane. Alternatively or optionally in addition, the support region adjoins the support section with a support angle of less than 60 degrees, preferably less than 40 degrees, in particular less than 20 degrees, in relation to the radial plane. In this case, the contact device is supported on the support region, in particular in an installation situation, with the formation of the support angle. Thus, in particular the contacting portion makes contact with the discharge partner or possibly with the intermediate component, forming an angle deviating from a right angle, in particular the support angle. By supporting the contact device, greater rigidity of the contact device, in particular of the contacting portion, can be achieved, so that the risk of the contacting portion lifting off and the electrical connection being interrupted as a result is minimized.

In one possible embodiment, it is provided that the discharge device is designed to bridge an annular gap between one and the other discharge partner. The discharge device preferably has the shape of an annular or ring-shaped disc, wherein the inner diameter and the outer diameter are adapted to or correspond to the inner diameter and outer diameter of the respective discharge partner.

Furthermore, the discharge device has at least one opening, which forms or helps to form an air passage in the annular gap in an axial direction. The opening cross-section of the opening and/or the air passage is preferably designed to be larger than 2 square millimeters, in particular larger than 4 square millimeters. In particular, the opening forms at least or exactly one channel that is continuous in the axial direction as an air passage or part of an air passage.

With the discharge device with the opening, the consideration is that due to the relative rotational movement of the discharge partners to one another, in particular of the shaft relative to the surrounding structure, or due to temperature changes, there can be a pressure difference in front of and behind the discharge device, wherein the pressure difference can be dissipated through the at least one opening in the annular gap in a functionally reliable manner and in particular in a manner that is safe from contamination. By reducing the pressure difference, it is avoided that the discharge device is loaded in the axial direction by the pressure difference and can shift or tilt during continuous operation. The result of this is that the functional properties of the discharge device and thus of the electric drive assembly are improved, in particular in continuous operation.

The opening is preferably designed as an opening at the edge, which is delimited on a radial side by one of the discharge partners. In particular, the opening is designed to be between the expanding portions. A plurality of openings is thus formed, wherein one opening is each arranged circumferentially at the edge between two expanding portions. This configuration has the advantage that the annular ring of the discharge device is not weakened by the opening and is therefore more stable in continuous operation. Alternatively or optionally in addition, the discharge device has at least the opening at the edge and at least one through-opening as a further opening. The through-opening is preferably arranged in a radial region between the outer diameter and the inner diameter of the discharge device. In particular, the through-opening is designed to be closed all the way around. In the case of the two-part design, the through-opening can preferably be formed by the connecting opening of the formed parts.

In principle, the contacting portion can be designed as one or more, preferably elastically deformable, filaments, strips or circular ring segments. Preferably, however, the contacting portion and/or the contact device is designed as a ring-shaped or annular component, wherein the contacting portion is preferably designed concentrically to the shaft and/or to the housing section. In its basic form, the contacting portion is particularly preferably designed as an open or closed ring disc and/or blank, wherein the contacting portion has an opening, in particular a central hole, for receiving the shaft. The contacting portion is preferably deformed and/or deformable in the axial direction in the form of a plate or a shaft.

The contact device with the contacting portion is preferably designed as a component and/or part of a bearing unit, wherein the support body device is preferably designed as a clamping sleeve or as a clamping ring for a bearing device of the bearing unit. Alternatively or optionally in addition, the contacting portion is designed as a bearing seal or as a sealing disc.

In principle, the contact device and/or the support body device can be made of an electrically conductive metal or a metal alloy, e.g., steel, copper or aluminum. In particular, the contact device and the support body device can be made of different electrically conductive materials.

Alternatively, the contact device and/or the support body device is made from a composite material and/or a composite material which has electrically conductive properties. For example, the composite material is made from a graphite-copper-resin composite mixture.

Alternatively, the contact device and/or the support body device is provided with an electrically conductive coating. For example, the coating can be applied to the contacting portion as a particle, layer or fiber composite material.

Alternatively, the contact device, in particular the contacting portion, can be formed from electrically conductive fibers. In particular, these fibers can be present as loose fibers, as a yarn or as a woven fabric. As a fabric, the electrically conductive fibers can be processed, for example, into a felt or into a woven, embroidered or tufted fabric layer. The fabric can be formed entirely or partially from electrically conductive fibers and partially from other fibers, such as plastic fibers. The electrically conductive fibers are preferably designed as metallic fibers or as filled or coated polymer fibers, but particularly preferably as carbon fibers.

In a preferred embodiment, it is provided that the contacting portion has electrically conductive fibers, wherein the electrically conductive fibers are preferably designed to be at least in a region of the contacting portion of the contact device. The contacting portion has an adhesive layer for embedding the electrically conductive fibers, wherein the adhesive layer is preferably designed for materially connecting the electrically conductive fibers to the contacting portion. The adhesive layer preferably forms an adhesive bed for the electrically conductive fibers. The adhesive layer is preferably formed from an electrically conductive adhesive, wherein the adhesive is designed, for example, as a dispersion adhesive or as a solvent-based adhesive. The adhesive layer is applied to the contacting portion, wherein the adhesive layer is preferably applied to the contacting portion and/or applied by spraying, rolling, brushing or dipping the contacting portion or by a pad printing or screen printing process. In particular, the adhesive layer is curable, so that the electrically conductive fibers can be introduced into the adhesive layer in a wet and/or liquid and/or viscous state and are materially bonded to the contacting portion after the adhesive layer has cured and/or solidified. The electrically conductive fibers are preferably embedded with one of their ends in the adhesive layer, wherein the other ends are designed as free ends of the electrically conductive fibers.

Furthermore, the electrically conductive fibers are arranged on the contacting portion for the electrical connection to one of the discharge partners, in particular the second discharge partner. In particular, the free ends of the electrically conductive fibers are designed so that they can be placed on one of the discharge partners for the purpose of electrically connecting the contacting portion. The electrically conductive fibers are particularly preferably in covering contact with one of the discharge partners. The electrically conductive fibers are preferably held elastically in the adhesive layer, so that when the electrically conductive fibers are in contact with one of the discharge partners, flexible deformation of the electrically conductive fibers results in a dimensional overlap of the electrically conductive fibers with one of the discharge partners. The overlapping of the electrically conductive fibers on the discharge partner can preferably be seen as a sliding contact, wherein the sliding contact forms an electrical connection between one of the discharge partners and the contacting portion of the contact device via the covering electrically conductive fibers. In particular, the electrically conductive fibers are in direct or indirect contact with one of the discharge partners, for example via a sleeve, wherein as the discharge partners rotate relative to one another, the electrically conductive fibers rub against a contact point and form the sliding contact, so that a permanent electrical connection is created for discharging the electrical charge and/or voltage of the shaft as the first discharge partner via the discharge device to the second discharge partner. The electrically conductive fibers preferably have a fiber length of at least 0.3 mm, in particular at least 0.2 mm, in particular at least 0.1 mm, wherein the electrically conductive fibers preferably have a maximum fiber length of 5 mm, in particular a maximum of 10 mm, in particular of a maximum of 20 mm. It is advantageous that the contacting portion with the electrically conductive fibers creates a discharge device, which compensates for tolerances and/or distances between the components, in particular between rotating components and static components, so that a reliable discharge device for discharging the electrical charge and/or voltage between the two discharge partners is guaranteed. In this way, for example, a break in contact between the rotating shaft during operation and the stationarily carried discharge device can be avoided.

The conductive fibers are particularly preferably designed as flock fibers for flocking the contacting portion. The flock fibers preferably have the same fiber length and/or the same fiber thickness. The flock fibers are designed to be electrically conductive, wherein electrical conductivity of the flock fibers is provided by their material itself and/or by an electrically conductive coating on the flock fibers. The flock fibers are preferably applied to the contacting portion in a flocking process. In principle, the flock fibers can be applied to the contacting portion using any desired flocking method, for example in a form flocking method, a surface flocking method, an electrostatic flocking method or an electrostatic-pneumatic flocking method. The contacting portion is preferably electrostatically flocked with the flock fibers, wherein the contacting portion is preferably designed as a support substrate for the flock fibers and comprise the adhesive layer.

In electrostatic flocking, the flock fibers are applied into the wet adhesive in an electrostatic field between an anode and a cathode, specifically between an applicator with an anode and the contacting portion as a cathode. The flock fibers attach themselves to the adhesive layer, wherein the flock fibers form a flock pile on the adhesive-wetted region of the contacting portion. The flock fibers align themselves in the electrostatic field, so that the flock fibers are preferably aligned as a result of the process, e.g., perpendicular to a surface of the contacting portion. Alternatively or optionally in addition, the flock fibers are specifically aligned with this or another flocking method, e.g., can be applied and/or are applied with an angular offset to the surface of the contacting portion or anchored in a random alignment of the individual flock fibers with the adhesive layer. It is advantageous that through a targeted orientation of the flock fibers, the electrical contact with one of the discharge partners can be improved and undesirable frictional resistances, for example due to flock fibers aligned counter to a direction of rotation of the shaft, can be reduced.

The electrically conductive fibers are particularly preferably designed as carbon fibers. The carbon fibers, also referred to as carbon fibers or as carbon or carbon fibers, are preferably made from a carbon-containing starting material which can be carbonized into carbon in a pyrolysis process. The carbon fibers are designed to be electrically conductive and are preferably applied to the contacting portion by a flocking process. The carbon fibers are embedded in the adhesive layer, wherein the adhesive layer bonds the carbon fibers to the contacting portion. The contacting portion is electrically connected to one of the discharge partners via the carbon fibers; in particular, the carbon fibers form the sliding contact between the contacting portion and one of the discharge partners. Alternatively, the electrically conductive fibers are designed as derivatives of carbon fibers, as metallic fibers or as filled polymer fibers.

In a structural embodiment, it is provided that the discharge device comprises an abrasion protection device. The abrasion protection device has the function of protecting the electric motor against wear debris from the contact device. In particular, the wear debris is generated during operation of the electric motor due to friction during a relative movement between the two discharge partners. The abrasion protection device is preferably arranged on the side of the contact device facing the electric motor in order to prevent or at least reduce a transfer of the wear debris from the contact device to the electric motor. In particular, the abrasion protection device is designed and/or suitable for covering and/or sealing a transition region between the support body device and the discharge partner that is directly or indirectly connected to the contact device. The abrasion protection device particularly preferably forms a wear debris-proof separation in the direction of rotation around the shaft.

According to this embodiment, it is provided that the abrasion protection device has a further attachment portion. The further connecting portion is connected to the support section of the support body device. The contact device and the abrasion protection device are each clamped together via the associated attachment portion between the base body region and the clamping region, so that the two attachment portions are preferably held by a common clamp connection between the base body region and the clamping region. Depending on the configuration, as described above, the common clamping connection is designed either to be folded over the edge of the support body device, in particular through the folded expanding regions and clamping regions, to form the base body region and clamping region, or designed as the support body device with the base body region and the retaining support part with the clamping regions, wherein the contact device and the abrasion protection device are mechanically fastened to the support body device together via the common clamp connection and are electrically connected to one of the discharge partners via the connecting portion. In particular, the abrasion protection device extends circumferentially, in particular in the direction of rotation around the shaft and/or rotor shaft, between the two discharge partners without interruption and/or overlapping the contact device. In particular, "uninterrupted" should be understood to mean that the abrasion protection device has no interruptions, openings or the like. In particular, "overlapping" should be understood to mean that the abrasion protection device and the contact device overlap at least partially or completely, at least in an axial view with respect to the main axis. In particular, the abrasion protection device and the contact device are congruent with one another. The contact device and optionally the abrasion protection device are particularly preferably designed in a ring shape or an annular shape. In particular, the abrasion protection device is designed as an annular sealing disc. The sealing disc is preferably arranged to be coaxial with respect to the shaft, wherein this limiting or closing off of the annular gap is formed between the two discharge partners in the direction of the electric motor.

In a further specification, it can be provided that the abrasion protection device has a circumferential sealing lip. In particular, a touching, preferably a dynamic, seal is implemented by the sealing lip. The sealing lip lies directly against a sealing partner in the direction of rotation. At least the sealing lip is preferably designed as an elastic material, e.g., rubber, so that the sealing lip bears against the sealing partner in a sealing manner in the circumferential direction, in particular in a fluid-tight manner. In particular, the entire abrasion protection device is made of the elastic material, so that it is designed to be flexible. The sealing partner can be formed by one of the discharge partners, in particular the shaft, or possibly by the sleeve. The abrasion protection device is preferably implemented in the form of a shaft lip seal. In particular, the abrasion protection device designed as a sealing disc has the sealing lip on its inner and/or outer circumference. An abrasion protection device is thus proposed which is characterized by a particularly high degree of tightness and the entry of wear debris into the electric motor is significantly reduced or prevented.

Another object of the disclosure relates to the electric drive assembly with the discharge device and/or the bearing unit as previously described. The electric drive assembly has the electric motor section and the transmission section, wherein the electric motor section comprises the electric motor with the rotor and the shaft, wherein a transmission device is arranged in the transmission section, wherein the shaft is connected to the transmission device in terms of transmission technology. The electric drive assembly has a separating portion, wherein the separating portion is arranged between the electric motor section and the transmission section, in particular in the axial direction relative to the main axis. The separating portion includes a separating wall between the electric motor section and the transmission section. In particular, the electric motor section has a motor compartment and the transmission section has at least one transmission compartment, wherein the separating portion separates the motor compartment from the adjacent transmission compartment, in particular separating it in a dirt-proof or oil-proof manner. For example, the electric motor section has a motor part housing and the transmission section has a transmission part housing, wherein the separating portion is arranged in a separating manner between the motor part housing and the transmission part housing. Preferably, the motor part housing and the transmission part housing together form a housing for the electric drive assembly. The electric motor section is preferably designed as a dry region. The transmission section, in particular the adjoining transmission compartment, is implemented either as a wet region or as a dry region. In the event that this is realized as a dry region, the separating portion forms a dirt-proof separation. If this is implemented as a wet region, the separating portion forms an oil-proof separation.

The shaft, in particular the rotor shaft, is guided through the separating portion and sealed off from the separating portion with a sealing device. The sealing device can be designed as a contact sealing device or as a non-contact sealing device, in particular as a gap seal. For example, the sealing device is designed as a shaft passage.

It is further proposed that the discharge device or the bearing unit is arranged on a motor side of the sealing device and/or in the electric motor section. Thus, the discharge device is arranged on the electric motor side with respect to the sealing device. This has the advantage that the electrical/electronic components are all arranged on the side of the electric motor section, so that the responsibility for the electrical/electronic conversion is assigned to the electric motor section and the responsibility for the mechanical conversion to the transmission section. In addition, the discharge device is installed where the electrical charge and/or electrical voltage is generated in the rotor, so that it can be discharged in a spatially close manner.

In particular, the discharge device and/or the bearing unit is/are arranged in the axial direction in relation to the main axis between the rotor and the sealing device. The discharge device is thus shifted to the side of the electric motor that faces the sealing device. The remaining space which is available between the bearing device arranged on the transmission side and the sealing device can thus be used for the discharge device.

For example, the discharge device can be arranged between the bearing device and the sealing device. With this configuration, the discharge device is moved further from the free end of the rotor shaft in the electric motor section to the center of the rotor shaft, so that the voltage and/or the electrical charge can be discharged centrally from the rotor shaft as a discharge partner to the other discharge partner. In addition, the position particularly protects the transmission section with the transmission device, so that any bearings in the transmission device cannot suffer any damage from the passage of current. As an alternative to this, the discharge device can be arranged on the side of the bearing device which is remote from the sealing device. In particular, the discharge device is arranged between two bearing devices, wherein the two bearing devices form or help to form the rotor bearing.

In a further specific implementation, the electric drive assembly has a bearing unit. The bearing unit has the bearing device, which is used for bearing the shaft. The bearing device has a first and a second bearing ring, wherein at least or precisely one row of rolling elements is arranged in a rolling manner between the two bearing rings. In particular, one bearing ring is designed as an inner bearing ring, via which the bearing device is supported on the shaft. In particular, the other bearing ring is designed as an outer bearing ring, via which the bearing device is supported on the surrounding structure, the housing section or the component. The two bearing rings each have a raceway for the rolling elements. The bearing unit is thus designed as a rolling bearing, for example as a ball or roller bearing.

Furthermore, the bearing unit has a discharge device, as also described above. The support body device is mechanically and electrically connected to one of the bearing rings via the expanding portions, wherein the contact device is electrically connected to the other of the bearing rings via the contacting portion. In particular, one bearing ring is electrically connected to one discharge partner and the other bearing ring is electrically connected to the other discharge partner. Thus, the electrical charge and/or electrical voltage is discharged from the rotor via the shaft as the first discharge partner and one of the bearing rings, in particular the bearing inner ring, via the discharge device to the other bearing ring, in particular the bearing outer ring, and the second discharge partner. The discharge device is preferably connected to one bearing ring in a rotationally fixed and/or captive manner via the connecting portion, in particular the expanding regions. The expanding portions are preferably expanded against an inner diameter of the bearing outer ring or against an outer diameter of the bearing inner ring, so that the discharge device is arranged between the two bearing rings. Thus, the discharge device and the storage device form a common assembly as the storage unit.

BRIEF DESCRIPTION OF THE DRAWINGS

Further features, advantages, and effects of the disclosure are set out in the following description of the preferred exemplary embodiments. In the drawings.

DETAILED DESCRIPTION

Figure 1:
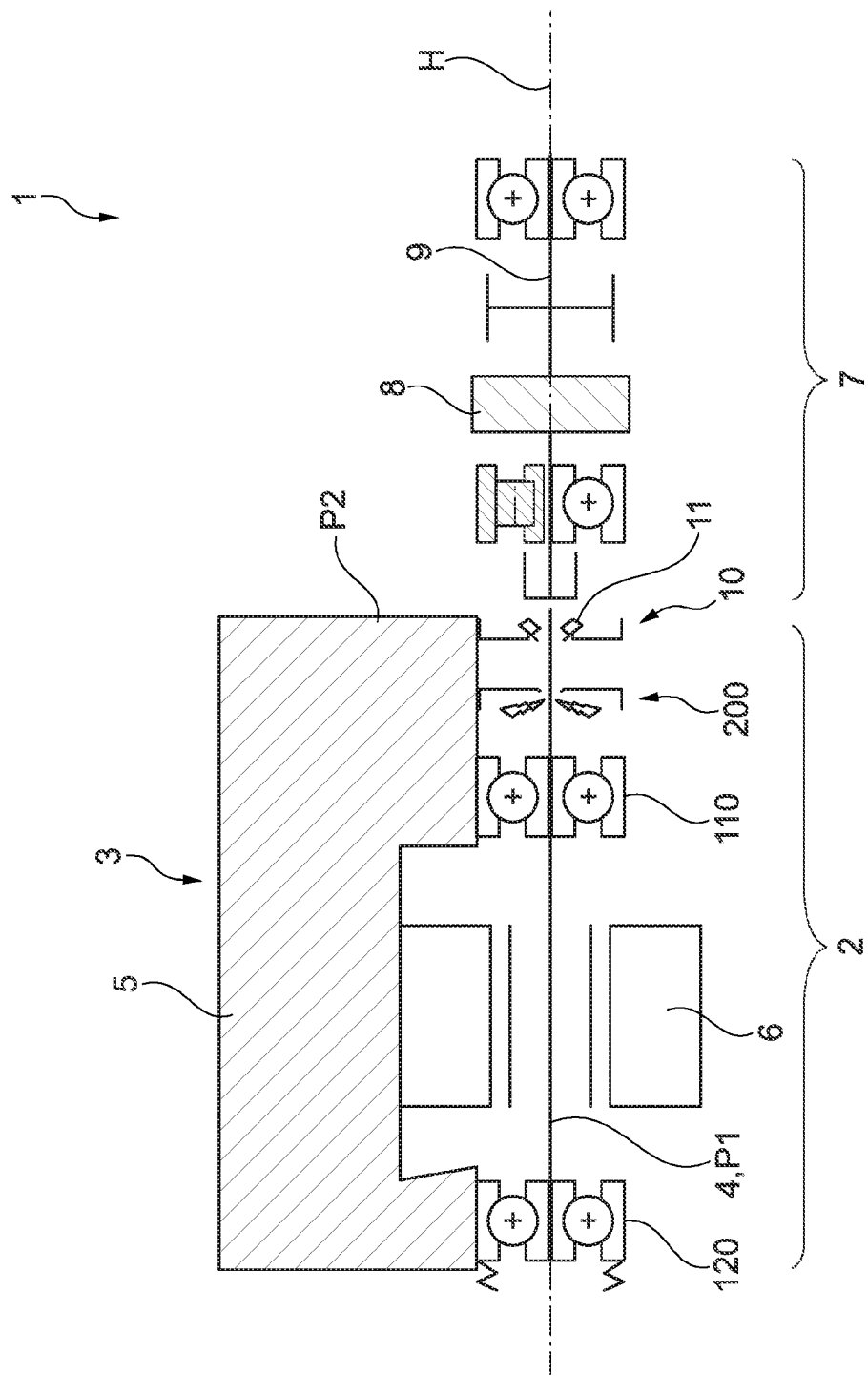
FIG. 1 shows a schematic representation of a drive assembly with a discharge device as an exemplary embodiment.

FIG. 1 shows a schematic representation of an electric drive assembly 1 for a vehicle, not shown, as an exemplary embodiment. For example, the vehicle can be designed as a single or multi-track vehicle and/or as a single or multi-axle vehicle. For example, the vehicle is a purely electric vehicle or a hybrid vehicle. The vehicle can be designed, for example, as a passenger car, a bus or a truck. Alternatively, however, the vehicle can also be designed, for example, as a bicycle (pedelec), motorcycle (electric motorcycle) or e-scooter.

The drive assembly 1 serves to generate and/or provide a traction torque, in particular a main traction torque, for the vehicle. For this purpose, the drive assembly 1 has an electric motor section 2, which has an electric motor 3 for generating the traction torque and a shaft 4 for transmitting the traction torque. The electric motor 3 can be electrically connected to an energy device, for example a battery or an accumulator, in order to obtain energy for generating the traction torque. The electric motor 3 can be designed, for example, as a direct current, synchronous or asynchronous motor.

The electric motor 3 has a stator 5 and a rotor 6. The rotor 6 is connected in a driving manner to the shaft 4 so that the shaft 4 is driven via and/or by the rotor 6. The shaft 4 is thus designed as a rotor shaft and is mechanically, for example non-rotatably, and electrically connected to the rotor 6 for this purpose. The shaft 4 defines a main axis H with its axis of rotation, wherein the stator 5 and the rotor 6 are arranged to be coaxial and/or concentric relative to one another with respect to the main axis H.

For the rotatable mounting of the shaft 4, the electric motor section 2 has a first and a second bearing device 110, 120, wherein the shaft 4 is supported in the radial direction on the stator 5 via the bearing devices 110, 120. In the exemplary embodiment shown, the bearing devices 110, 120 are each designed as a ball bearing, in particular a grooved ball bearing.

Furthermore, the electric drive assembly 1 has a transmission section 7 which is used for the transmission and/or translation and/or distribution of the traction torque of the electric motor 3. For this purpose, a transmission device 8, indicated only schematically, is arranged in the transmission section 7, wherein the transmission device 8 comprises a clutch device, e.g., a form-fitting or friction-fitting clutch, and/or a shifting device, e.g., a transmission device, for example a planetary and/or step gear transmission. The electric motor section 2 and the transmission section 7 are connected to one another via the shaft 4 in terms of transmission technology, wherein the shaft 4 forms an input shaft into the transmission device 8. The traction torque can be passed on to one or more wheels of the vehicle, for example, via an output shaft 9.

Furthermore, the electric drive assembly 1 has a separating portion 10 which separates a motor compartment of the electric motor section 2 from an adjacent transmission compartment of the transmission section 7. For this purpose, the separating portion 10 is arranged in the axial direction in relation to the main axis H between the electric motor section 2 and the transmission section 7. For example, the engine compartment can be a dry region and the adjoining transmission compartment can be another dry region or a wet region, wherein the separating portion 10 forms a dirt-proof and optionally an oil-proof separation between the electric motor section 2 and the transmission section 7. The shaft 4 is guided through the separating portion 10 and sealed off from the separating portion 10 by a sealing device 11. The sealing device 11 can be designed, for example, as a contacting sealing device, for example a shaft sealing ring, or as a non-contacting sealing device, for example a gap seal.

When the electric motor 3 is operating as a motor, discharge currents can be caused which can discharge via the bearing devices 110, 120 and damage the bearing devices 110, 120. For this purpose, the electric drive assembly 1 has a discharge device 200, which is used to divert an electrical charge and/or electrical voltage from the rotor 6 via the shaft 4, as a first discharge partner P1, to a second discharge partner P2.

The second discharge partner P2 forms a stationary discharge partner in relation to the first discharge partner P1, i.e., the shaft 4. The second discharge partner P2 can be formed, for example, through the stator 5 itself and/or through a housing section, e.g., motor housing, and/or a surrounding construction, e.g., chassis, and/or a component which is electrically conductively connected with the stator 5, the housing section or the surrounding construction. The discharge device 200 forms an electrical connection between the first discharge partner P1 and the second discharge partner P2. In this case, the second discharge partner P2 is connected to ground and/or is grounded, so that the shaft 4 is grounded via the discharge device 200. For this purpose, the discharge device 200 forms a current path with a lower resistance compared to the storage devices 110, 120, so that the discharge currents are discharged parallel to the storage devices 110, 120. The two discharge partners P1, P2 are constantly electrically connected to one another via the discharge device 200, wherein electrical discharge takes place in both a stationary manner and dynamic manner, i.e., during engine operation.

In the exemplary embodiment shown, the discharge device 200 is arranged in the axial direction with respect to the main axis H between the first bearing device 110 and the separating portion 10 in the electric motor section 2. The discharge device 200 is thus arranged on the side close to the transmission in relation to the first bearing device 110 in the motor compartment. This position close to the transmission allows the transmission section 7 to be protected from discharge currents, so that any bearings in the transmission device 8 are not damaged.

Figure 2:
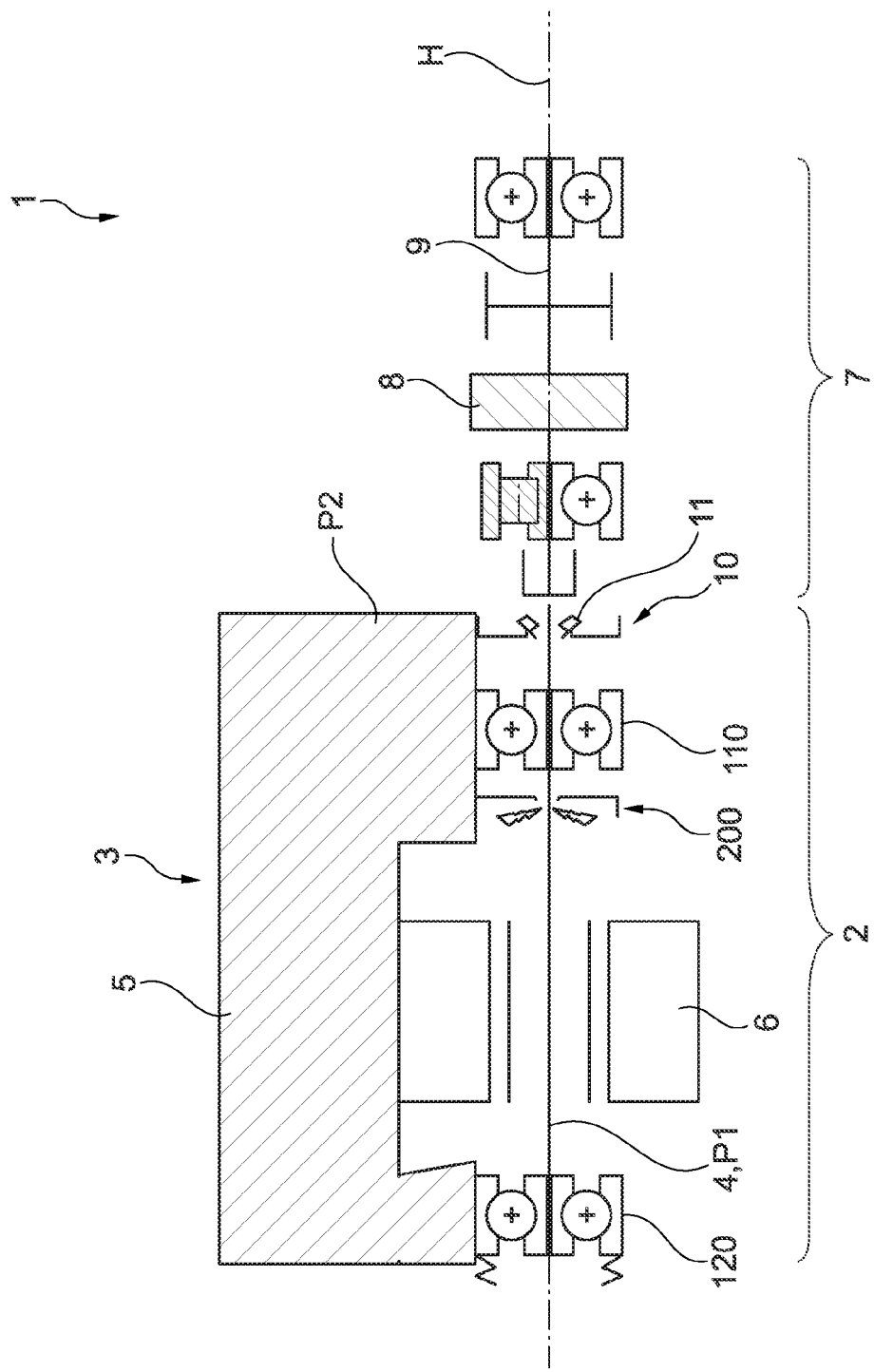
FIG. 2 shows the drive assembly in the same representation as FIG. 1 as a further exemplary embodiment.

FIG. 2 shows the drive assembly 1 in the same representation as FIG. 1 as a further exemplary embodiment. In the exemplary embodiment shown, the discharge device 200 is arranged in the axial direction with respect to the main axis H between the rotor 6 and the first bearing device 110 in the electric motor section 2. The discharge device 200 is thus arranged on the side close to the engine in relation to the first bearing device 110 in the motor compartment. Due to this position close to the motor, the discharge device 200 can be installed where the electrical charge and/or electrical voltage is generated in the rotor 6, so that it can be discharged in a spatially close manner.

Figure 3:
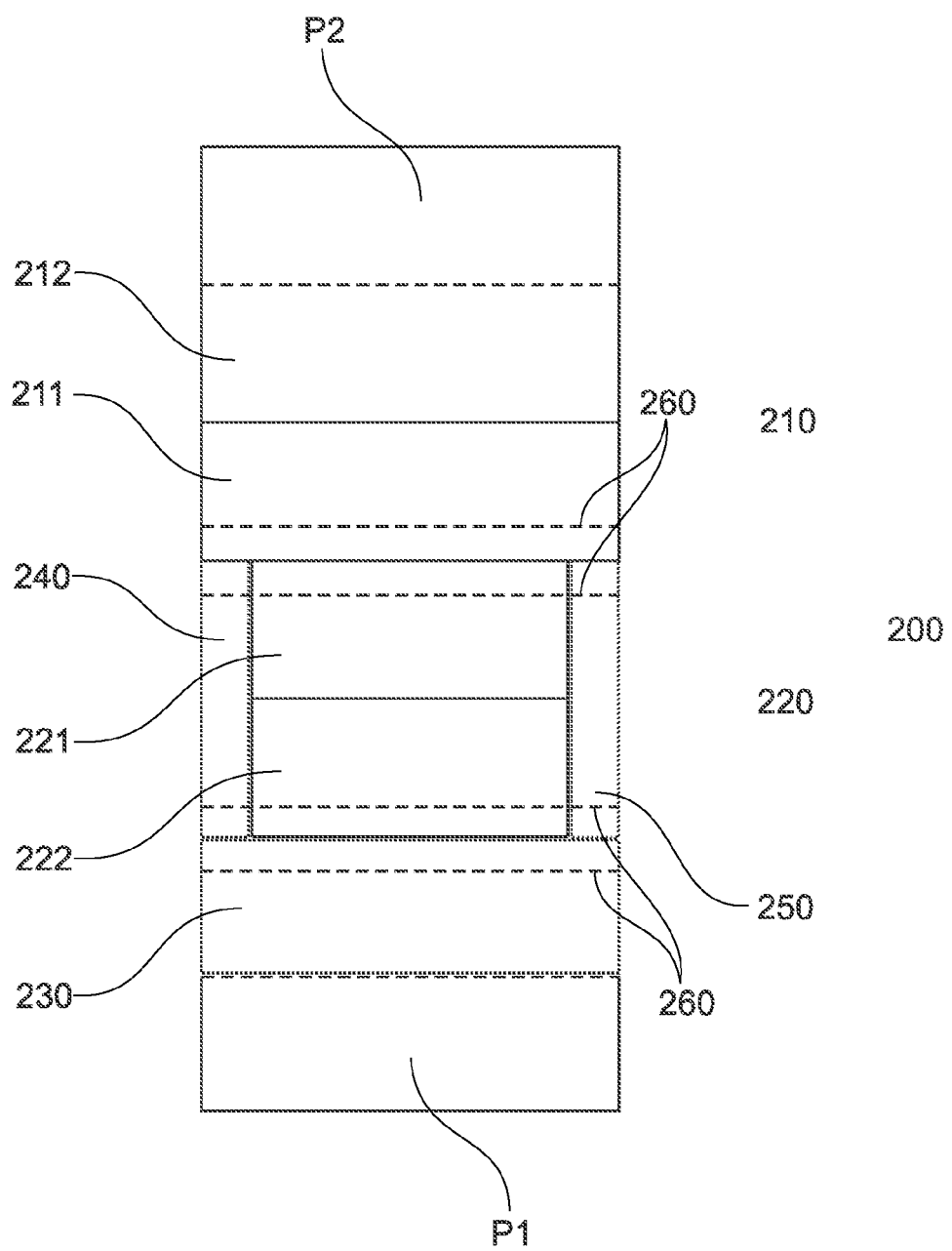
FIG. 3 shows a highly schematic representation of the discharge device of FIGS. 1 and 2.

FIG. 3 shows the discharge device 200 in a highly schematic block diagram, wherein the individual blocks are defined as function blocks and optional configurations are indicated by dotted lines.

The discharge device 200 has a support body device 210 and a contact device 220, wherein the contact device 220 is electrically and mechanically connected to the support body device 210. For this purpose, the support body device 210 has a support section 211 and the contact device 220 has an attachment portion 221, wherein the contact device 220 is attached to the support section 211 via the attachment portion 221, for example in a form-fitting and/or materially-bonded and/or friction-fitting manner.

Furthermore, the support body device 210 has a connecting portion 212 which directly adjoins the support section 211. The connecting portion 212 is used to mechanically and electrically fix the support body device 210 to the second discharge partner P2. The mechanical and electrical connection can coincide, but these can also be implemented side by side or in parallel with one another. The connecting portion 212 can be connected directly to the second discharge partner P2 and/or can be in contact with it. Alternatively or optionally in addition, the connecting portion 212 can be connected indirectly to the second discharge partner P2 via an intermediate component, not shown.

The contact device 220 has a contacting portion 222 which directly adjoins the attachment portion 221. The contacting portion 222 212 serves to make electrically conductive contact between the contact device 220 and the first discharge partner P1. In motor operation, the shaft 4, i.e., the first discharge partner P1, rotates about the main axis H, wherein the discharge device 200 remains stationary on the second discharge partner P2 and the two discharge partners P1, P2 are in permanent electrically conductive contact with one another via the contacting portion 222. The contacting portion 222 can be electrically connected directly to the first discharge partner P1, i.e., the shaft 4, and/or can be in contact with it. Alternatively, however, the contacting portion 222 can also be indirectly electrically connected to the first discharge partner P1 via a sleeve 230 as an optional intermediate component.

During motor operation, wear debris can occur at the contact point of the contacting portion 222 with the shaft 4 or the sleeve 230 as a result of the relative rotation between the two discharge partners P1, P2. This wear debris can have electrically conductive particles which must be kept away from the electric motor 3. For this purpose, the discharge device 200 optionally has a abrasion protection device 240 which protects the electric motor 3 against wear debris. For this purpose, the abrasion protection device 240 is arranged on the side of the electric motor 3 of the contact device 220 in order to prevent the wear debris from being transferred to the electric motor 3. The abrasion protection device 240 is connected to the support section 211 of the support body device 210 together with the contact device 220. The abrasion protection device 240 is designed, for example, in such a way that it shields and/or seals the entire contact device 220 or at least the contact point between the contacting portion 220 and the shaft 4 or the sleeve 230 from the electric motor 3 in relation to the main axis H, both in the axial direction and in the circumferential direction. The abrasion protection device 240 forms a wear debris-proof separation between the first bearing device 110 and the sealing device 10, as shown in FIG. 1. Alternatively, the abrasion protection device 240 forms a wear debris-proof separation between the rotor 6 and the first bearing device 110, as is shown in FIG. 2.

Optionally, the deflection device 200 can have a further abrasion protection device 250 in order to prevent the wear debris from being transferred in the other direction, in particular to the transmission section 7. The additional abrasion protection device 250 is connected to the support section 211 of the support body device 210 together with the abrasion protection device 240 and the contact device 220. The abrasion protection device 240 is designed, for example, in such a way that it shields and/or seals the entire contact device 220 or at least the contact point between the contacting portion 220 and the shaft 4 or the sleeve 230 from the transmission section 7 in relation to the main axis H, both in the axial direction and in the circumferential direction. The additional abrasion protection device 250 can thus enclose or encapsulate the wear debris between the two abrasion protection devices 240, 250, so that a transfer to the electric motor 3, for example through-openings arranged in the discharge device 200, can be prevented. In addition, the entry of foreign particles from the transmission section 7, for example oil, to the contact point of the contact device 220 can be prevented by the further abrasion protection device 250.

The discharge device 200 serves to bridge an annular gap between the two discharge partners P1, P2, wherein the discharge device 200 optionally has at least one opening 260 in the annular gap in order to form an air passage in the axial direction. For example, the opening 260 can be formed by at least or exactly one through-opening, e.g., one or more bores or one or more openings, or by at least or exactly one edge opening, e.g., one or more cutouts. It is conceivable that a large number of through-openings form a grid-like structure, for example, in order to prevent or at least reduce the transfer of solids, in particular wear debris, to the electric motor 3.

The opening 260, indicated schematically here by a dashed line, can optionally be introduced into the support body device 210 and/or the contact device 220. For example, the opening 260 can be made in the support section 211 and/or the attachment portion 221 and optionally in the abrasion protection device 240 and/or the further abrasion protection device 250. Alternatively, the opening 260 or optionally a further opening can be introduced into the contacting portion 222 and optionally into the abrasion protection device 240 and/or the further abrasion protection device 250. Alternatively, the opening 260 or optionally a further opening can be made in the sleeve 230.

Figure 4:
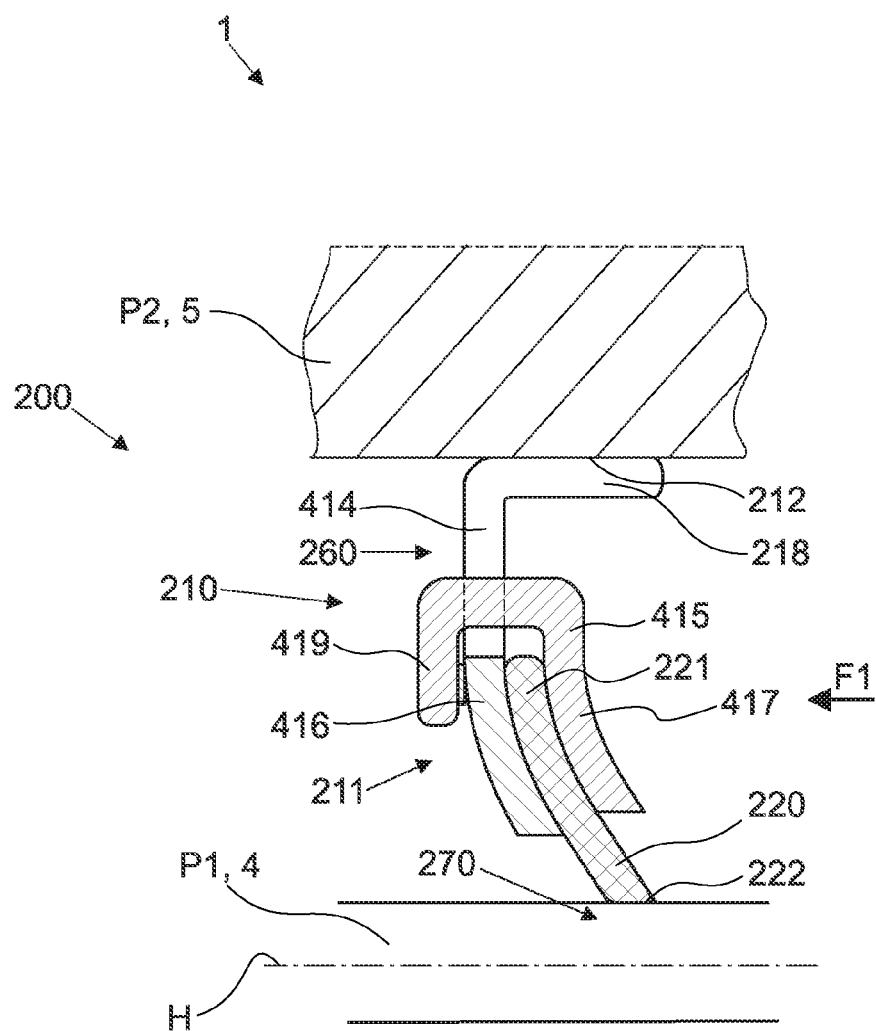
FIG. 4 shows a sectional view of the discharge device in a first structural embodiment.

FIG. 4 shows the discharge device 200 in a sectional view as a first structural embodiment, wherein the discharge device 200 is arranged in the drive assembly 1 in a position close to the transmission or the motor, as described above. The drive assembly 1 is only indicated in FIG. 4 and is represented by the first discharge partner P1 and the second discharge partner P2. The first discharge partner is designed as the shaft 4, which is designed to be rotatable about the main shaft H and represents a dynamic discharge partner during operation. The second discharge partner P2 is designed, for example, to be the stator 5 itself and/or the housing section, e.g., the motor housing, and/or as one of the surrounding constructions and/or as one of the components and is indicated in FIG. 4 as a stationary discharge partner. The discharge device 200 is arranged in the radial direction between the first and the second discharge partner P1, P2, so that the annular gap between the two discharge partners (P1, P2) is bridged.

In its basic form, the discharge device 200 is designed as a serrated ring and/or as an annular component and has a concentric receiving opening 270 through which the shaft 4 extends and/or is guided. Furthermore, the discharge device 200 has the support body device 210 and the contact device 220 which are connected via the support section 211 and the attachment portion 221. These are arranged essentially in the radial direction relative to one another in order to bridge the annular gap in the radial direction. The contact device 220 has a smaller diameter than the support body device 210 and is in contact with the first discharge partner P1, the shaft 4, via the contacting portion 222, so that there is an electrical connection. The contacting portion 222 is formed by an inner diameter of the contact device 220, wherein the contacting portion 222 rests the shaft 4 in a rubbing and/or sliding manner. Alternatively, the contacting portion 222 has electrically conductive fibers (not shown) which are arranged at the point of contact between the contacting portion 222 and the shaft 4, wherein the electrically conductive fibers form an electrically conductive sliding contact.

The support body device 210 has a plurality of expanding portions 218 which are designed to be on the outer diameter of the support body device 210 and are arranged to be spaced apart from one another in the circumferential direction. The expanding portions 218 extend in the axial direction, wherein the connecting portion 212 is formed by the expanding portions 218 for the electrical and mechanical connection to the second discharge partner P2. The expanding portions 218 can be seen as prongs or teeth of the support body device 210, which are arranged on the outer diameter, wherein these are designed to be reshaped and/or angled in the axial direction. The expanding portions 218 are designed, for example, in such a way that they elastically expand against the second discharge partner P2, so that a clamping force is created in the radial direction, which connects the discharge device 200 to the second discharge partner P2 in a rotationally fixed manner. This creates a static discharge device which is held in a rotationally fixed manner on the second discharge partner P2 during operation of the drive assembly 1, i.e., when the shaft 4 rotates. In principle, a dynamic discharge device is also conceivable, wherein it is designed to be non-rotatable with the shaft 4. Accordingly, the expanding portions 218 can be arranged on an inner diameter of the support body device 210 and deformed in an axial direction, so that the connecting portion 212 is mechanically and electrically connected to the shaft 4 and the contact device 210 rests on the second discharge partner P2.

According to the exemplary embodiment in FIG. 4, the support body device 210 is designed in two parts. For this purpose, the support body device 210 has an expanding support part 414 and a retaining support part 415. The expanding support part 414 can be viewed as a base support for supporting the support bracket portion 415, wherein the expanding support part 414 comprises the expanding portions 218 and a base body region 416, as described above. The base body region 416 is designed as a lateral annular surface of the support body device 210 and/or the expanding support part 414, wherein the base body region 416 forms a first clamping partner of a clamp connection for the attachment portion 221. A second clamping partner is formed by a clamping region 417 of the retaining support part 415, wherein the clamping region 417 is designed as a counter surface and faces the base body region 416. In its basic form, the contact device 220 is designed as a ring or an annular disc, wherein this is inserted between the expanding support part 414 and the retaining support part 415, wherein the attachment portion 221 is clamped between the base body region 416 and the clamping region 417. The contact device 220 is held in a load-bearing manner by the clamping connection and is connected in a rotationally fixed manner to the second discharge partner P2 via the expanding portions 218 of the support body device 210.

The retaining support part 415 has a plurality of coupling regions 419 for fastening the retaining support part 415 to the expanding support part 414. The coupling regions 419 are designed as tabs or prongs, wherein the coupling regions 419 extends behind the expanding support part 414. The retaining support part 415 with the coupling regions 419 is designed to be essentially U-shaped and secure the retaining support part 415 in a form-fitting and/or force-fitting manner on the expanding support part 414. The coupling regions 419 extend through the opening 260, which are formed by the spaced-apart expanding regions 218 at the edge. Thus, the coupling regions 419 are designed to be between the expanding regions 218 and reshaped around an edge of the expanding support part 414 and/or the base body region 416. For example, the coupling regions 419 are bent through 180 degrees toward the shaft 4. It can be said that the retaining support part 415 is designed in an original state as a serrated ring with outer prongs as coupling regions 419, wherein the outer prongs are bent inwards for attachment to the expanding support part 414 and/or are bendable. The coupling regions 419, in addition to being attached to the expanding body part 414, have the task of generating a clamping force F1, wherein the clamping force F1 counteracts the base body region 416 via the clamping region 417, so that the attachment portion 221 is held between them in a friction-fitting manner.

Figure 5:
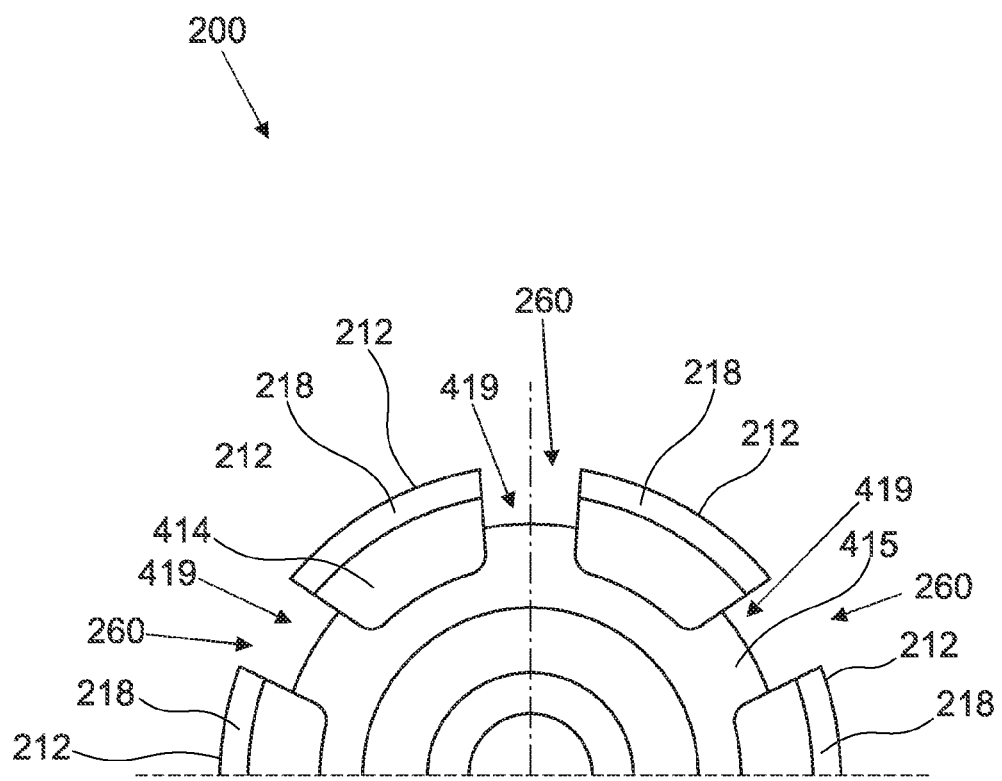
FIG. 5 shows an axial plan view of the discharge device of FIG. 4.

FIG. 5 shows the discharge device 200 from FIG. 4 in an axial top view with the expanding support part 414 and the retaining support part 415. The expanding portions 218 are designed to be at the edge on the outer diameter of the expanding support part 414 and are arranged in a circumferentially offset manner. The resulting gaps form the openings 260, which form the air passage in the annular gap in the axial direction. The retaining support part 415 has the plurality of coupling regions 419, wherein these are offset in the circumferential direction relative to the expanding regions 218 on the retaining support part 415 at the edge. Thus, the coupling regions 419 are assigned to the openings 260, wherein the coupling regions 419 are passed through the openings 260 in the axial direction, so that they encompass the expanding support part 414. The connecting portion 212 is formed by a divided outer surface of the deformed expanding portions 218. Thus, the connecting portion 212 contacts the second discharge partner P2, for example via six expanding portions 218, which are arranged in the circumferential direction and brace in the radial direction against the second discharge partner P2. For example, the six expanding portions 218 are arranged circumferentially, offset by an angle of 60 degrees.

Figure 6:
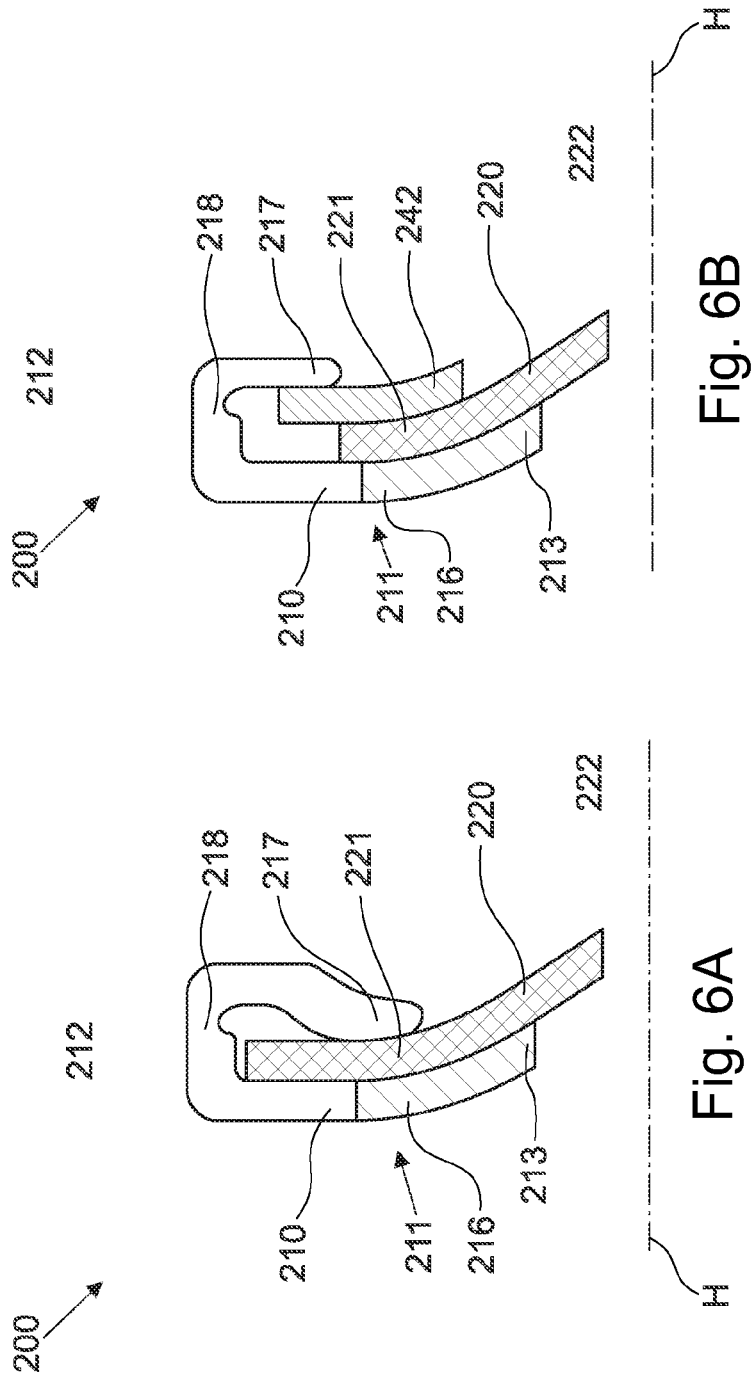
FIG. 6A shows a sectional view of the discharge device in a second structural embodiment.
FIG. 6B shows a sectional view of the discharge device from FIG. 6a with a connecting part.

An alternative exemplary embodiment of the discharge device 200 is shown in FIGS. 6A and 6B, wherein the support body device 210 is designed to be in one piece and/or to be integral. FIG. 6A shows the discharge device 200 with the support body device 210 and the contact device 220, wherein the support body device 210 comprises the expanding portions 218, a base body region 216 and clamping regions 217. The clamping regions 217 are each connected to the base body region 216 via an expanding portion 218. The support body device 210 is designed to be U-shaped and/or hook-shaped in the sectional view, so that the support section 211 is formed by the expanding portions 218 folding over with the clamping regions 217. The clamping regions 217 can, for example, be crimped around an edge of the contact device 220 and/or the attachment portion 221, so that it is encompassed and pressed against the base body region 216 in a clamping manner. For example, the support body device 210 has three or more expanding portions 218 and clamping regions 217, wherein these are arranged circumferentially around the main axis H and are bent around the circumferential edge of the contact device 220 toward the main axis H. For example, the expanding regions 218 and the clamping regions 217 are offset by 120 degrees about the main axis H.

In addition, the support body device 210 has a support region 213 which adjoins the base body region 216 at an angle to form a support angle. The contact device 220, in particular the contacting portion 222, is supported at an angle on the support region 213, forming the support angle. For example, the support region 213 is angled at a support angle of 45 degrees relative to the base body region 216. On the one hand, the support region 213 can improve the clamping connection between the support section 211 and the connecting portion 221, so that the contact device 220 is secured against slipping out. On the other hand, a more stable contact of the contacting portion 222 on the one discharge partner P1, P2 can be ensured.

Alternatively or optionally in addition, the support body device 210 has a connecting part 242, as shown in FIG. 6B. In its basic form, the connecting part 242 is designed as a ring and/or an annular disc, wherein the connecting part 242 is designed coaxially to the main axis H. The connecting part 242 is inserted together with the attachment portion 221 in the support section 211, wherein the connecting part 242 is arranged on the side of the attachment portion 221 facing the clamping regions 217. The connecting part 242 is clamped in together with the connecting portion 221, wherein the connection part 242 is enclosed all the way round and rests on the connecting portion 221. As a result, a region that rests on the connecting portion 221 can be increased, so that a compact design of the clamping regions 217 can be implemented.

Figure 7:
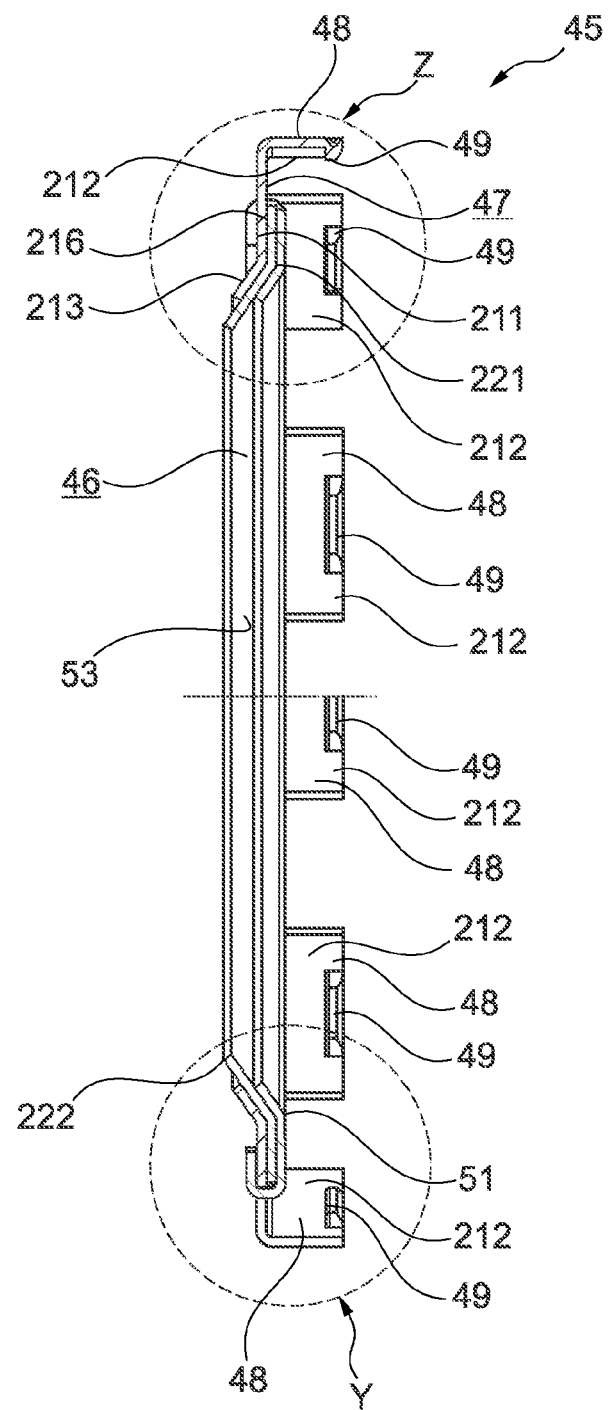
FIG. 7 shows an exemplary embodiment of a discharge device 45 in a longitudinal sectional view.

The discharge device 45 shown in FIG. 7 consists of the contact device 46 and a support body device 47 functioning as a holder. An expanding support part 50, shaped as a retaining ring, of the support body device 47 is provided with axially extending expanding regions 48. A radially inwardly directed projection 49 is designed to be on the respective expanding portion 48 for snap-mounting on a rolling bearing, not shown. The support body device 47 also has a retaining support part 51 which is separate from the support body device 47 and is designed in the form of a retaining disc.

Figure 8:
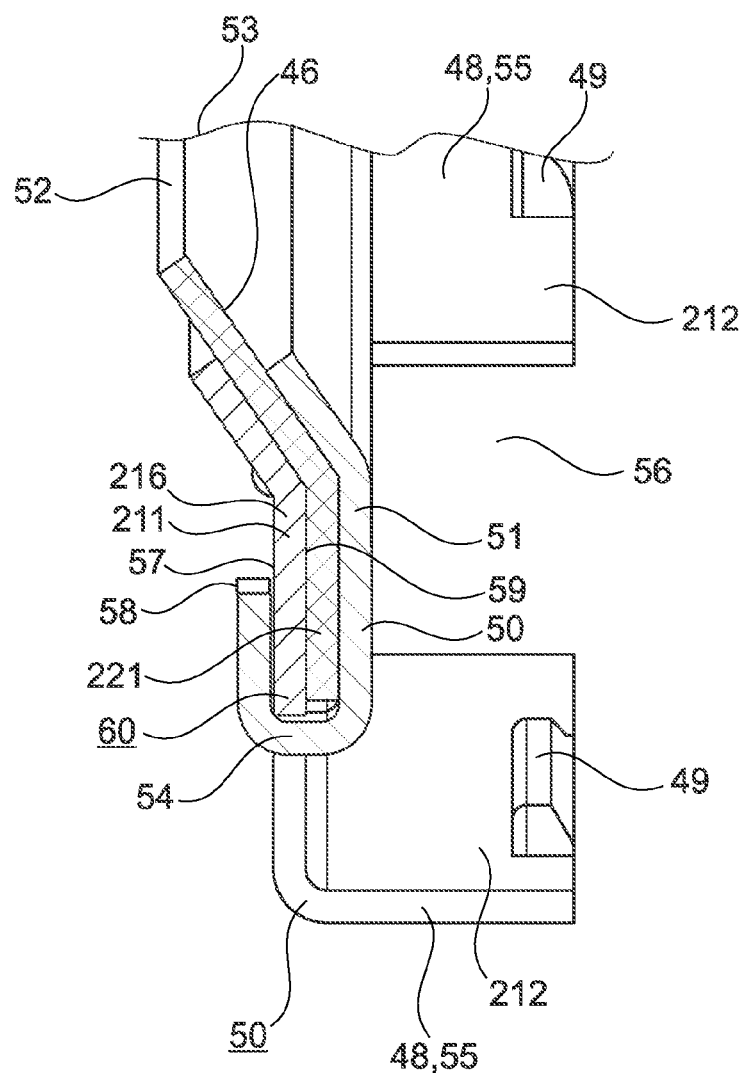
FIG. 8 shows the detail Y of the discharge device shown in FIG. 7.
Figure 9:
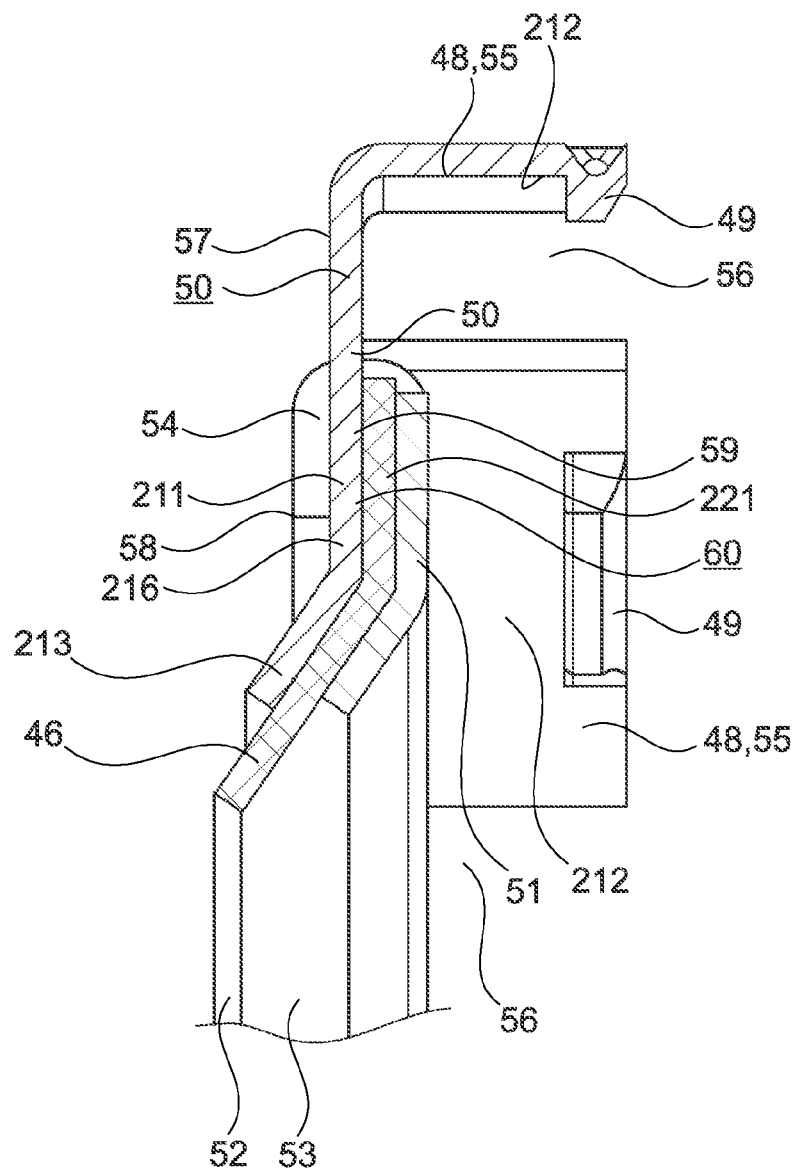
FIG. 9 shows detail Z of the discharge device shown in FIG. 7.

FIGS. 7 to 9—The support body device 47 has a connecting portion 212 on the inside of the expanding regions 48 for electrical and mechanical connection to a discharge partner (not shown), which is, for example, the outer ring of a rolling bearing (not shown). The respective connecting portion 212 also grasps the respective projection 49. A support section 211 in the shape of a circular disc is designed to be on the support body device 47. The contact device 46 has a contacting portion 53 for electrical connection in the sense of a sliding contact with a discharge partner, not shown, which is, for example, an inner ring of a rolling bearing or a shaft or a sleeve. In this case, the electrical connection is therefore provided as a sliding contact with the bearing ring, the shaft or the sleeve, on which at least the contacting portion 53 rests in a sliding manner. The contact device 46 is provided with a connecting portion 221 designed in the shape of an annular disc, via which the contact device 46 is connected to the support section 211 of the support body device 47.

The support body device 47 has expanding portions 48 for expanding the connection of the support body device 47 to a discharge partner, not shown. The expanding portions 48 have the connecting portion 212 radially on the inside, which also includes the radial projections 49.

FIGS. 8 and 9—The detail Y from FIG. 8 is enlarged in FIG. 8 and is not drawn to scale. The detail Z from FIG. 7 is enlarged in FIG. 9 and is not shown to scale.

The contact device 46 is an annular disc with a receiving opening 52. At least the edge region 53 (contacting portion) of the annular disc at the receiving opening 52 is provided for contact with a shaft (not shown), alternatively with an inner ring (not shown) or alternatively with a hollow-cylindrical component. The contact device 46 is clamped axially between the retaining support part 51 and the expanding support part 50 and consists of a mesh or fabric with electrically conductive carbon fibers. On the retaining support part 51, clamping regions 54 are designed to be in one piece and designed to be integral and of one material as flexible tabs. The expanding portions 48 are designed to be in one piece and of one material with the expanding support part 50 and are elastic brackets 55, with the axially directed end of which the radial projection 49 is designed to be in one piece and of one material. The expanding portions 48 are circumferentially spaced apart from one another by openings 56 in the form of recesses 56. The retaining support part 51 rests on the rear of the contact device 46 and axially penetrates one of the recesses 56 with a clamping region 54 designed on the flexible lugs. On the front side 57 of the retaining ring 50, the clamping element 54 engages behind the expanding support part 50 axially and rests with its radial end 58 on the front side 57 of the expanding support part 50 axially. The retaining support part 51 on the back 59 of the expanding support part 50 and the clamping region 54 on the front side 57 of the expanding support part 50 form a form-fitting non-detachable clamp connection 60 between the expanding support part 50, the contact device 46 and the retaining support part 51. The expanding support part 50 and the retaining support part 51 are components cut from sheet metal.

Figure 10:
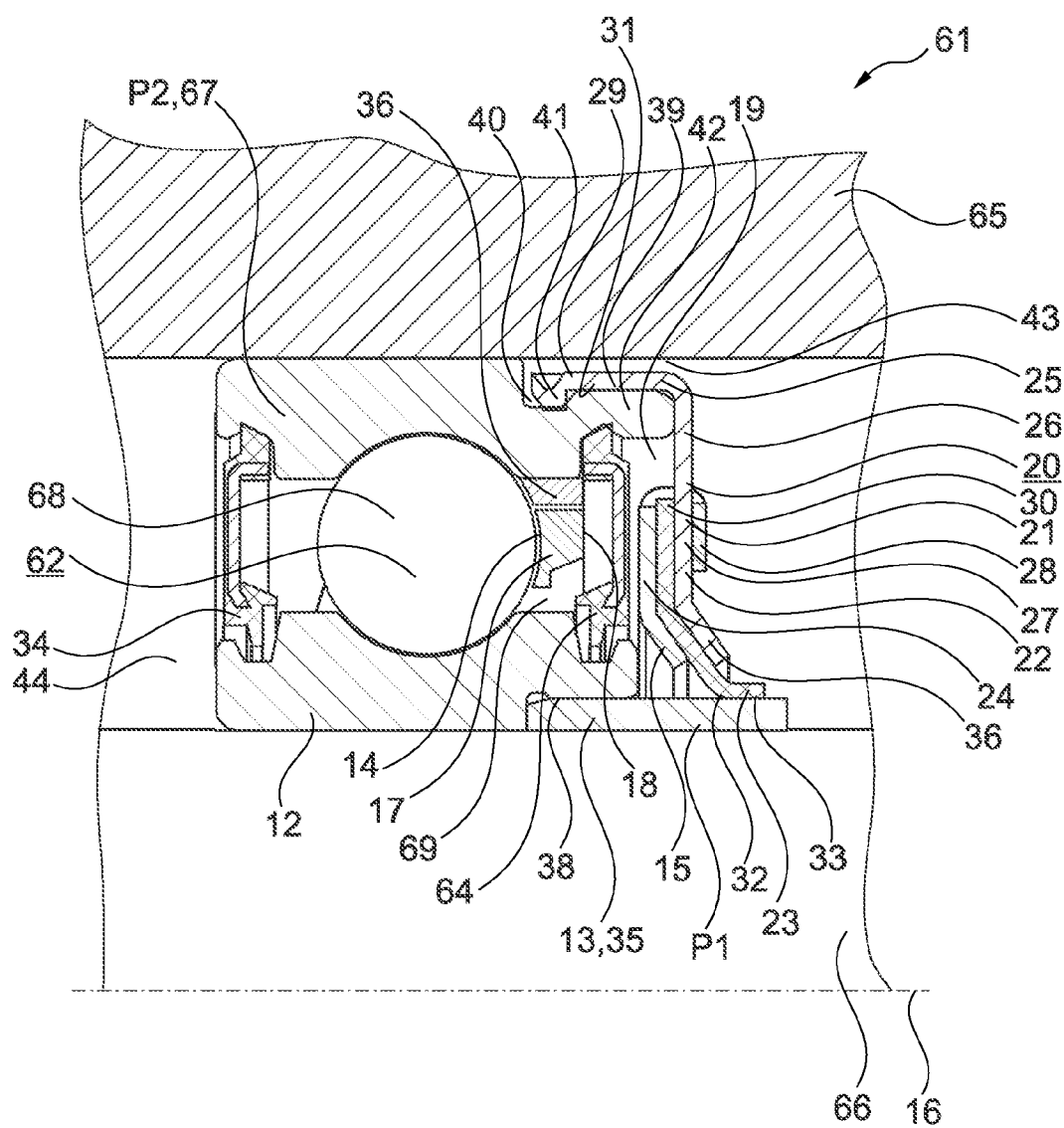
FIG. 10 shows an exemplary embodiment of a rolling bearing device 61 with a rolling bearing 62 and a discharge device 20, in a longitudinal sectional view along the axis of rotation 16.

FIG. 10—The rolling bearing device 61 is made up of a rolling bearing 62, the seal 64, the seal 34 and the discharge device 20, and has a housing 65, a shaft 66 and a sleeve 35.

The rolling bearing 62 has at least one inner ring 12 and one outer ring 67 as well as a discharge device 20. The rolling bearing 62 designed as a deep groove ball bearing is provided with rolling elements 68 which are arranged radially between the bearing rings 12 and 67 and which are balls. The balls are guided in a cage 69. The cage 69 has a number of recesses 14 corresponding to the number of rolling elements 68 and a side edge 17 running around the axis of rotation 16. In each recess 14 sits a ball.

The seals 64 and 34 designed as the main seal are inserted radially into the rolling bearing 62 between the bearing rings 12 and 67. The side edge 17 runs axially between the rolling elements 68 and the seal 64 in an annular gap 36 around the axis of rotation 16.

The inner ring 12 is provided on the inside and on the side of the discharge device 20 at a diameter step with an inner cylindrical inner seat surface 38 on which the sleeve 35, designed as a hollow cylindrical component 13, is seated, for example held by a press fit. The diameter step results from the fact that the diameter of the inner seat surface 38 is larger than the diameter of the inner ring 12 inside for the shaft seat.

The discharge device 20 has a support body device 21, a retaining support part 24, an electrically conductive contact device 23 and the sleeve 35. On a radially extending base body region 27 of an expanding support part 22 of the support body device 21 designed to be in one piece and of one material with the support body device 21, expanding regions 25 are designed, of which only an expanding region 25 is visible in the representation according to FIG. 10. The expanding portions 25 are separated from one another in the circumferential direction by openings 26, which are open radially outwards in the direction of the housing 65, designed as recesses between the expanding portions 25 designed as brackets 29.

The outer ring 67 is provided with a diameter step on the outside, resulting in an axial overhang 42 on the outer ring 67, on which an outer seat surface 39 is designed. The cylindrically designed outer seat surface 39 has a diameter which is smaller than the outer diameter of the outer ring 67 for the housing seat. The outer seat surface 39 is axially adjoined by a radial indentation 40 which could consist of indentations 40 adjacent to one another on the peripheral side, but in this case is designed as an annular groove 40. Brackets 29 of the expanding portions 25 have the connecting portion 31 for the electrical and mechanical connection of the support body device 21 to the second discharge partner P2 on the inside, are radially spring-elastic and are pushed onto the overhang 42 during assembly. The connecting portion 31 also extends over the radial projections 41. When they are pushed on, they move elastically outwards, i.e., are spread apart radially, extend axially over the outer seat surface 39 to the annular groove 40 and finally snap into the annular groove 40 with the radial projections 41, are then latched radially with the locking projections 41 in the annular groove 40 and are preferably in radial contact with the outer seat surface 39 or are radially pre-loaded against it and form the elastic expanding connection between the expanding portions 25 and the outer ring 67 designed as the second discharge partner P2. When the rolling bearing 62 is inserted into the housing 65, an annular gap 43 is designed to be between the overhang 42 and the inner cylindrical wall of the housing bore 44.

An intermediate compartment 19 is designed to be axial between the disc-shaped base body region 27 and the seal 64, which is delimited outwards in the radial directions on one side by an axial overhang 42 of the outer ring 67 and on the other side by a section of the sleeve 35.

The connecting portion 30 of the contact device 23 is clamped axially between the retaining support part 24 and a base body region 27 of the expanding support part 22. The retaining support part 24 is fixed to the base body region 27 with retaining clips 28. Of the retaining clips 28, only one retaining clip 28 is visible in the image due to the sectional view. The retaining clips 28 reach through the recess or opening 26 axially and are attached to the edge of the base body region 27 in a form-fitting manner, for example with a snap connection. The opening 26 forms an axial passage between the intermediate compartment 19 designed as an annular gap 37 and the region surrounding the rolling bearing 62, via which the annular gap 37 is ventilated.

Both the expanding support part 22 and the retaining support part 24 have a support region 15 or 36 which is directed towards the shaft 66 and which is inclined towards the shaft 66 at a support angle deviating from 90°. The support regions 15 and 36 run approximately parallel and parallel between them runs a section of the contact device 23, which is stabilized and supported by the support regions 15 and 36 on the one hand and is oriented so obliquely in its course to the first discharge partner P1 on the other that optimal contact of the contacting portion 32 is achieved on the first discharge partner P1. In addition, the support regions 15 and 36 offer additional protection against mechanical damage to the fabric of the contact device 23.

The contact device 23 is provided with a contacting portion 32 around its receiving opening 33. The contacting portion 32 is used for an electrical connection in the form of a sliding contact with the sleeve 35 designed as the first discharge P1. Between the contact device 23 and the base body region 27 in the rolling bearing 62 there is an electrical connection between the outer ring 67 via the brackets 29 and the expanding support part 22 to the contact device 23 and from the contact device 23 to the first discharge partner P1 and in the opposite direction. In the rolling bearing device 61 there is an electrical connection between the housing 65 and the second discharge partner P2, from the outer ring 67 to the brackets 29 and from the expanding support part 22 to the contact device 23 and the contacting portion 32 to the first discharge partner P1 and from the sleeve 35 to the inner ring 12 and in the opposite direction.

LIST OF REFERENCE SIGNS

1 Drive assembly
2 Electric motor section
3 Electric motor
4 Shaft
5 Stator
6 Rotor
7 Transmission section
8 Transmission device
9 Output shaft
10 Separating portion
11 Sealing device
13 Hollow cylindrical component
14 Recess of the cage
15 Support region
16 Axis of rotation
19 Intermediate compartment
20 Discharge device
21 Support body device
22 Expanding support part
23 Contact device
24 Retaining support part
25 Expanding portion
26 Recess/opening
27 Base body region
28 Retaining clip
29 Bracket/of the expanding portion
30 Attachment portion
31 Connecting portion
32 Contacting portion
33 Receiving opening
34 Seal
35 Sleeve
36 Support region
37 Annular gap
38 Inner seat surface
39 Outer seat surface
40 Indentation
41 Radial projection
42 Axial overhang
43 Annular gap
44 Housing bore
45 Discharge device
46 Contact device
47 Support body device
48 Expanding portion
49 Radial projection of the expanding portion
50 Expanding support part
51 Retaining support part
52 Receiving opening
53 Contacting portion
54 Clamping region
55 Bracket
56 Recess/opening
57 Front side of the expanding support part
58 End of clamping region
59 Rear side of the expanding support part
60 Clamping connection
61 Rolling bearing device
62 Rolling bearing
64 Seal
65 Housing
66 Shaft
67 Outer ring
68 Rolling elements
69 Cage
110 First bearing device
120 Second bearing device
200 Discharge device
210 Support body device
211 Support section
212 Connecting portion
213 Support region
216 Base body region
217 Clamping region
218 Expanding portion
220 Contact device
221 Attachment portion
222 Contacting portion
242 Connecting part
260 Opening
270 Receiving opening
414 Expanding support part
415 Retaining support part
416 Base body region
417 Clamping region
419 Coupling region
H Main axis
P1 First discharge partner
P2 Second discharge partner

The invention claimed is:

1. A discharge device for discharging at least one of an electrical charge or voltage from a rotor of an electric motor from a first discharge partner to a second discharge partner, the discharge device comprising:
a support body device having a connecting portion for electrical and mechanical connection to one of the discharge partners; and
a contact device having a contacting portion for electrical connection to an other of the discharge partners, and the contact device being connected to the support body device;
wherein the support body device has expanding portions for expanding the connection of the support body device to one of the discharge partners, and the expanding portions have the connecting portion; and
wherein one of the discharge partners is a housing, and the expanding portions are pre-loaded radially outwards against the housing.

2. The discharge device according to claim 1, wherein the discharge device is configured to bridge an annular gap between the discharge partners, and the discharge device has at least one opening which forms or helps to form an air passage in the annular gap in an axial direction.

3. The discharge device according to claim 1, wherein the contact device has electrically conductive fibers at least in a region of the contacting portion, and the electrically conductive fibers are arranged on the contacting portion for electrical connection to one of the discharge partners.

4. The discharge device according to claim 1, wherein one of the discharge partners is a bearing ring of a rolling bearing, and the expanding portions are pre-loaded radially inwards against the bearing ring.

5. The discharge device according to claim 1, wherein the first discharge partner is a conductive sleeve fastened to a bearing ring of a rolling bearing.

6. The discharge device according to claim 1, wherein the contact device has an attachment portion, and the support body device has a base body region and at least one clamping region, and the attachment portion is clamped between the base body region of the support body device and the at least one clamping region.

7. The discharge device according to claim 6, wherein the discharge device is configured to bridge an annular gap between the discharge partners, and the discharge device has at least one opening which forms or helps to form an air passage in the annular gap in an axial direction.

8. The discharge device according to claim 6, wherein the contact device has electrically conductive fibers at least in a region of the contacting portion, and the electrically conductive fibers are arranged on the contacting portion for electrical connection to one of the discharge partners.

9. The discharge device according to claim 1, wherein the contact device has an attachment portion and the support body device has an expanding support part with the expanding portions, a base body region and a retaining support part, the retaining support part is connected to the expanding support part, and the attachment portion is clamped between the base body region and the retaining support part.

10. The discharge device according to claim 9, wherein the support body device has a support region for supporting the contact device, the support region adjoins the base body region at an angle, forming a support angle, and the contact device is supported on the support region at the support angle.

11. The discharge device according to claim 9, wherein the discharge device is configured to bridge an annular gap between the discharge partners, and the discharge device has at least one opening which forms or helps to form an air passage in the annular gap in an axial direction.

12. The discharge device according to claim 9, wherein the contact device has electrically conductive fibers at least in a region of the contacting portion, and the electrically conductive fibers are arranged on the contacting portion for electrical connection to one of the discharge partners.

13. An electric drive assembly, comprising:
   an electric motor section having an electric motor with a rotor and a shaft, the shaft with the rotor being connected, electrically and for torque transmission, to a transmission section,
   a transmission device arranged in the transmission section, the shaft being connected for torque transmission to the transmission device and being to a discharge device for discharging at least one of an electrical charge or voltage from the rotor of the electric motor from a first discharge partner to a second discharge partner, the discharge device comprising:
   a support body device having a connecting portion for electrical and mechanical connection to one of the discharge partners;
   a contact device having a contacting portion for electrical connection to an other of the discharge partners, and the contact device being connected to the support body device;
   wherein the support body device has expanding portions for expanding the connection of the support body device to one of the discharge partners, and the expanding portions have the connecting portion; and
   wherein a separating portion is arranged between the electric motor section and the transmission section, and a sealing device seals the shaft through the separating portion, and the discharge device is arranged at least one of on a motor side of the sealing device or in the electric motor section.

14. The electric drive assembly according to claim 13, further comprising a bearing unit having a bearing device that supports the shaft, the bearing device has a first and a second bearing ring, at least one set of rolling elements is arranged in a rolling manner between the first and second bearing rings, and the support body device is mechanically and electrically connected to one of the first or second bearing rings via the expanding portions, and the contact device is electrically connected to the other of the first or second bearing rings via the contacting portion.

15. A discharge device for discharging at least one of an electrical charge or voltage from a rotor of an electric motor from a first discharge partner to a second discharge partner, the discharge device comprising:
   a support body having a connecting portion for electrical and mechanical connection to one of the discharge partners;
   a contact device having a contacting portion for electrical connection to an other of the discharge partners, and the contact device being connected to the support body;
   wherein the support body has expanding portions configured to expand the connection of the support body to one of the discharge partners, and the expanding portions have the connecting portion; and
   wherein the discharge device is configured to bridge an annular gap between the discharge partners, the discharge device has at least one opening which forms an air passage in the annular gap in an axial direction, and the at least one opening extends through at least one of the support body and the contact device.

16. The discharge device according to claim 15, wherein one of the discharge partners is a housing, and the expanding portions are pre-loaded radially outwards against the housing.

17. The discharge device according to claim 15, wherein one of the discharge partners is a bearing ring of a rolling bearing, and the expanding portions are pre-loaded radially inwards against the bearing ring.

* * * * *